(12) United States Patent
Jordahl et al.

(10) Patent No.: US 10,152,297 B1
(45) Date of Patent: Dec. 11, 2018

(54) CLASSROOM SYSTEM

(71) Applicant: Lightspeed Technologies, Inc., Tualatin, OR (US)

(72) Inventors: David M. Jordahl, Estacada, OR (US); Baiqiang Ren, Richmond (CA)

(73) Assignee: Lightspeed Technologies, Inc., Tualatin, OR (US)

( * ) Notice: Subject to any disclaimer, the term of this patent is extended or adjusted under 35 U.S.C. 154(b) by 0 days.

(21) Appl. No.: 15/947,655

(22) Filed: Apr. 6, 2018

Related U.S. Application Data

(60) Provisional application No. 62/589,467, filed on Nov. 21, 2017.

(51) Int. Cl.
| | |
|---|---|
| *G06F 17/00* | (2006.01) |
| *G06F 3/16* | (2006.01) |
| *H04L 29/06* | (2006.01) |
| *H04R 3/12* | (2006.01) |
| *H04M 1/725* | (2006.01) |

(52) U.S. Cl.
CPC .......... *G06F 3/165* (2013.01); *H04L 65/1089* (2013.01); *H04R 3/12* (2013.01); *H04M 1/7253* (2013.01); *H04R 2420/07* (2013.01)

(58) Field of Classification Search
CPC ... H01M 1/7253; H01M 1/72558; G03F 3/16; G03F 3/165; H04R 27/00; H04R 2227/003; H04R 5/04; H04R 3/12; H04R 2420/07; G06F 1/1684; G06F 1/1688
See application file for complete search history.

(56) References Cited

U.S. PATENT DOCUMENTS

| | | | |
|---|---|---|---|
| 5,823,788 A | 10/1998 | Lemelson et al. | |
| 6,741,720 B1 | 5/2004 | Myatt | |
| 7,079,028 B2 | 7/2006 | Herrmann et al. | |
| 7,778,434 B2 | 8/2010 | Juneau et al. | |
| 7,999,226 B1 | 8/2011 | Koller et al. | |
| 8,483,757 B2 | 7/2013 | Bodley et al. | |
| 8,861,744 B1 | 10/2014 | Solomon et al. | |
| 2002/0022453 A1* | 2/2002 | Balog | H04W 40/02 455/41.2 |

(Continued)

FOREIGN PATENT DOCUMENTS

GB 2463924 A 4/2010

OTHER PUBLICATIONS

Product Information concerning prior art products obtained from the website of Revolabs Inc.

*Primary Examiner* — Andrew C Flanders
(74) *Attorney, Agent, or Firm* — Klarquist Sparkman, LLP

(57) ABSTRACT

A distributed audio system can comprise a first radio and a second radio. The first radio can comprise a first control data pathway for wirelessly coupling to a first mobile device through which first control signals are transmitted and a first audio pathway for wirelessly coupling to a second mobile device through which audio signals are transmitted. The second radio can comprise a second control data pathway for wirelessly coupling to a second mobile device through which second control signals are transmitted and a second audio pathway for wirelessly coupling to the first mobile device through which audio signals are transmitted. Transmission of the audio and control signals is selectively blocked from one of the mobile devices when the other is recording or playing back audio.

21 Claims, 17 Drawing Sheets

(56) References Cited

U.S. PATENT DOCUMENTS

| | | | |
|---|---|---|---|
| 2002/0026442 A1* | 2/2002 | Lipscomb | G06F 17/30861 |
| 2002/0124097 A1* | 9/2002 | Isely | H04H 60/95 |
| | | | 709/231 |
| 2004/0161728 A1 | 8/2004 | Benevento, II | |
| 2004/0234088 A1 | 11/2004 | McCarty et al. | |
| 2005/0027539 A1 | 2/2005 | Weber et al. | |
| 2005/0135304 A1* | 6/2005 | Wentink | H04B 7/2126 |
| | | | 370/329 |
| 2006/0065859 A1 | 3/2006 | Lapstun et al. | |
| 2006/0209785 A1* | 9/2006 | Iovanna | H04L 29/06 |
| | | | 370/351 |
| 2007/0038999 A1* | 2/2007 | Millington | H04J 3/0664 |
| | | | 718/100 |
| 2007/0142944 A1* | 6/2007 | Goldberg | G10H 1/0025 |
| | | | 700/94 |
| 2009/0077405 A1* | 3/2009 | Johansen | H04W 52/0254 |
| | | | 713/323 |
| 2009/0239502 A1* | 9/2009 | Dempo | H04L 12/4011 |
| | | | 455/411 |
| 2010/0315997 A1* | 12/2010 | Kim | H04N 21/43615 |
| | | | 370/328 |
| 2014/0282747 A1* | 9/2014 | Richman | H04N 21/2146 |
| | | | 725/62 |
| 2015/0121435 A1* | 4/2015 | Wang | H04N 21/4131 |
| | | | 725/81 |
| 2016/0295321 A1* | 10/2016 | Bauer | H04R 3/00 |

\* cited by examiner

CLASSROOM SYSTEM

CROSS REFERENCE TO RELATED APPLICATION

This Application claims the benefit of U.S. Provisional Application Ser. No. 62/589,467, entitled CLASSROOM SYSTEM, filed on Nov. 21, 2017, which is incorporated by reference herein.

FIELD

This disclosure relates to a classroom system that coordinates the transmission of audio signals to and from various locations in a classroom.

SUMMARY

In a traditional classroom environment, a teacher stands in front of a large number of students (e.g., 15-30 students in a typical classroom) and lectures to the entire class. Because of this setup, the teacher presents the same lecture in the same manner to every student in the class. If a student wishes to ask a question, the teacher must pause the lesson for the entire class to answer the student's question. This model can be inefficient when students in the classroom are of varying academic abilities in a particular subject or have different learning styles.

An emerging model of classroom instruction involves separating a classroom of students into several small groups (e.g., groups of 3-6 students). Students can be grouped together based on having similar learning styles, academic ability, or other factors. One or more teachers can then address each group of students individually to provide more personalized instruction to each student in a class.

One challenge with this model of instruction is that it can be difficult for a teacher to manage the classroom activity of each of the various groups. This can be addressed using a distributed audio system that can allow a teacher can easily communicate remotely with any of the groups of students.

In such a classroom environment it may be desirable to have a second teacher or assistant teacher who can also communicate remotely with groups of students. And it can be desirable to allow the teacher and the assistant to use mobile devices such as smart phones to select which group or groups of students they communicate with at any given time. It can also be desirable to allow the teacher and the assistant to record audio of their interactions with the students through the smart phone devices and to playback audio from the smart phones or from other outside sources coupled to the smart phones.

However, if a teacher and an assistant are both using mobile devices to control a distributed audio system and record audio from the system on the mobile devices or playback audio from or by the mobile devices, the control signals and audio signals from other smart phones interfere with the recording or playing back of audio by another smart phone. This interference can degrade the quality of audio that can be recorded or played back. This is a very difficult technical problem to solve.

Accordingly, there is a need for a distributed audio system that can allow at least two instructors to control a classroom system with respective mobile devices and that allows recording and playing back audio signals by one of the mobile devices while minimizing interference with the recording and playback by the other mobile devices.

In accordance with an embodiment disclosed herein, a distributed audio system or classroom system comprises first and second radios each of which receives control and audio signals from mobile devices. During at least a portion of the time of recording or playback of audio signals by one of the mobile devices, the other mobile devices are prevented from sending control and audio signals to the radios. In addition, in accordance with another aspect of an embodiment of a classroom system, a first mobile device can send control signals to a first radio of a radio relay station and audio signals to a second radio of the relay station. In addition, a second mobile device can send control signals to the second radio and audio signals to the first radio. This cross coupling of audio and control signals from mobile devices to different radios of the radio relay station further reduces interference. Cross coupling of control signals and audio signals to different radios, in combination with locking out control signals and audio signals from delivery to the radio relay station by mobile devices that are not recording or playing back audio further enhances the quality of audio being recorded or played back by reducing interference with such audio.

In one representative embodiment, a distributed audio system for transmitting audio signals to and receiving audio signals from at least one remote audio source and for transmitting and receiving audio and control signals to and from a plurality of mobile devices, such as at least first and second mobile devices can comprise a first radio, a second radio, and a processor. The first radio can comprise a first control data pathway for wirelessly coupling to the first mobile device through which first control signals can be wirelessly transmitted to and received from the first mobile device. The first radio can also comprise a first audio pathway for wirelessly coupling to the second mobile device through which audio signals can be wirelessly transmitted to and received from the second mobile device. The second radio can comprise a second control data pathway for wirelessly coupling to the second mobile device through which second control signals can be wirelessly transmitted to and received from the second mobile device. The second radio can also comprise a second audio pathway for wirelessly coupling to the first mobile device through which audio signals can be wirelessly transmitted to and received from the second mobile device. The processor can be coupled to the first and second radios and programmed to cause the delivery of control signals to the second mobile device through the second control data pathway to block the transmission of control signals from the second mobile device to the second control data pathway and to block the transmission of audio signals from the second mobile device to the first audio pathway at least during a portion of a time that the first mobile device is receiving audio signals through the second audio pathway from the at least one remote audio source and recording the received audio signals from the at least one remote audio source. The processor can also be programmed to cause the delivery of control signals to the first mobile device through the first control data pathway to block the transmission of control signals from the first mobile device to the first control data pathway and to block the transmission of audio signals from the first mobile device to the second audio pathway at least during a portion of a time that the second mobile device is receiving audio signals through the first audio pathway from the at least one remote audio source and recording the received audio signals from the at least one remote audio source.

In some embodiments, the processor can be programmed to cause a message to be displayed at the one of the first and second mobile devices from which the transmission of control signals and audio signals is blocked. In these embodiments, the blocked mobile device can indicate the blocking out of the blocked mobile device.

In some embodiments, the first and second radios can have Bluetooth low energy (BLE) standard enabled respective first and second control data pathways and Bluetooth (BT) enabled respective first and second audio pathways.

In some embodiments, the system can further comprise a third radio coupled to the first and second audio pathways and to the first and second control data pathways and wirelessly coupled to the at least one remote audio source. In these embodiments, in response to control signals from the processor, the third radio can receive and deliver audio signals from the at least one remote audio source to the first and second audio pathways.

In some embodiments, the third radio can be a Digital Enhanced Cordless Telecommunications (DECT) standard enabled radio.

In some embodiments, the system can further comprise a fourth radio coupled to the first and second control data pathways and wirelessly coupled to the at least one remote audio source. In these embodiments, in response to control signals from the processor, the fourth radio can receive and deliver control signals to cause the at least one remote audio source to transmit audio signals to the first and second audio pathways.

In some embodiments, the fourth radio can be a Radio Frequency for Consumer Electronics (Zigbee RF4CE) standard enabled radio.

In some embodiments, the first and second radios can have Bluetooth low energy (BLE) standard enabled respective first and second control data pathways and Bluetooth (BT) enabled respective first and second audio pathways. The system can further comprise a third radio coupled to the first and second audio pathways and to the first and second control data pathways and wirelessly coupled to the at least one remote audio source. In response to control signals from the processor, the third radio can receive and deliver audio signals from the at least one remote audio source to the first and second audio pathways. The third radio can be a Digital Enhanced Cordless Telecommunications (DECT) standard enabled radio and the system can further comprise a fourth radio coupled to the first and second control data pathways and wirelessly coupled to the at least one remote audio source. In response to control signals from the processor, the fourth radio can receive and deliver control signals to cause the at least one remote audio source to transmit audio signals to the first and second audio pathways. The fourth radio can be a Radio Frequency for Consumer Electronics (Zigbee RF4CE) standard enabled radio.

In some embodiments, the first, second, third and fourth radios can be on a common circuit board with opposed first and second edges and opposed third and fourth side edges. In these embodiments, the first radio can be positioned adjacent to the first side edge of the circuit board and the second radio can be positioned adjacent to the second side edge of the circuit board. More specifically, the first radio can be positioned adjacent to the intersection of the first and third side edges and the second radio can be positioned nearer to the fourth side edge than the third side edge. Also, the third radio can be positioned in a central section of the circuit board that is between the first and second radios. More specifically, the third radio can be positioned nearer to the fourth side edge than the third side edge. Also, the fourth radio can be positioned in a section of the circuit board that is spaced further from the first side edge than the first radio and further from the second side edge than the second radio and at a location adjacent to the third side edge.

In some embodiments, the first mobile device can be not blocked by control signals on the first control data pathway from recording video of the location proximate to the at least one remote audio source during at least a portion of the time that the first mobile device is receiving audio signals through the second audio pathway and recording the received audio signals such that the first mobile device can record video corresponding to the recorded audio. The second mobile device can be not blocked by control signals on the second control data pathway from recording video of the location proximate to the at least one remote audio source during at least a portion of the time that the second mobile device is receiving audio signals through the first audio pathway and recording the received audio signals such that the second mobile device can record video corresponding to the recorded audio.

In some embodiments, the processor can be programmed to cause the delivery of control signals to the second mobile device through the second control data pathway to block the transmission of control signals from the second mobile device to the second control data pathway and to block the transmission of audio signals from the second mobile device to the first audio pathway at least during a portion of a time that the first mobile device is transmitting audio signals through the second audio pathway to the at least one remote audio source. In these embodiments, the processor can also be programmed to cause the delivery of control signals to the first mobile device through the first control data pathway to block the transmission of control signals from the first mobile device to the first control data pathway and to block the transmission of audio signals from the first mobile device to the second audio pathway at least during a portion of a time that the second mobile device is transmitting audio signals through the first audio pathway to the at least one remote audio source.

In another representative embodiment, a distributed audio system can comprise a radio relay station, a base unit coupled to the radio relay station, and a plurality of speaker units, with each speaker unit comprising a microphone and a speaker. The radio relay station can comprise a first radio configured to send and receive first control signals to and from a first mobile device and first audio signals to and from a second mobile device, and a second radio configured to send and receive second control signals to and from the second mobile device and second audio signals to and from the first mobile device. The radio relay station can also be configured to send relay control signals to the speaker units corresponding to the first and second control signals and relay audio signals to the speaker units corresponding to the first and second audio signals.

In some embodiments, the base unit can be configured to receive the relay control signals and relay audio signals from the radio relay station. The base unit can also be configured to transmit speaker unit control signals corresponding to the relay control signals to one or more of the speaker units selected in response to the relay control signals. The base unit can also be configured to transmit audio signals corresponding the first and second audio signals to one or more speakers of the speaker units selected in response to the speaker unit control signals. The base unit can also be configured to receive audio signals corresponding to audio detected by one or more microphones of the speaker units selected in response to the speaker unit control signals and to transmit the audio signals corresponding to the audio at the microphones at the selected one or more speaker units to the relay station for transmission by the relay station as audio signals to one of the first and second mobile devices selected in response to the first and second control signals. The speakers of one or more of the speaker units selected in response to the speaker unit control signals can broadcast audio corresponding to the one or more audio signals. Audio signals corresponding to audio detected by the microphones of one or more of the speaker units selected in response to the speaker unit control signals can be transmitted to the base unit and to one of the first and second mobile devices selected in response to the control signals for recording by the selected one of the first and second mobile devices.

In some embodiments, in response to first control signals from the first mobile device that cause the radio relay station to send relay control signals to the base unit that cause audio signals corresponding to the second audio signals to be sent from the radio relay station to one or more of the speaker units selected in response to the speaker control signals, the second radio can send second control signals to the second mobile device to block the second mobile device from sending second control signals and first audio signals to the radio relay station. In these embodiments, in response to second control signals from the second mobile device that cause the radio relay station to send relay control signals to the base unit that cause audio signals corresponding to the first audio signals to be sent to one or more of the speaker units selected in response to the speaker control signals, the first radio can send first control signals to the first mobile device to block the first mobile device from sending first control signals and second audio signals to the radio relay station.

In some embodiments, the distributed audio system can further comprise a first instructor unit comprising a first instructor unit speaker and a first instructor unit microphone, and a second instructor unit comprising a second instructor unit speaker and a second instructor unit microphone. In these embodiments, in response to first control signals, the radio relay station can send relay control signals to the base unit causing the base unit to open an audio pathway between the first instructor unit and one or more of the speaker units selected in response to the first control signals. In these embodiments, in response to second control signals, the radio relay station can send relay control signals to the base unit causing the base unit to open an audio pathway between the second instructor unit and one or more of the speaker units selected in response to the second control signals.

In some embodiments, the distributed audio system can further comprise a remote control configured to send remote control signals to the base unit causing the base unit to open an audio pathway between one or more of the first instructor unit and the second instructor unit and one or more of the speaker units selected in response to the remote control signals. This remote control can be Radio Frequency for Consumer Electronics (Zigbee RF4CE) standard enabled radio.

In some embodiments, the first and second control signals can be sent to the first and second mobile devices by the radio relay station using a Bluetooth Low Energy (BLE) radio. In these embodiments, the first and second control signals can be received from the first and second mobile devices by the radio relay station using a Bluetooth Low Energy (BLE) radio. The first and second audio signals can be received from the first and second mobile devices by the radio relay station using a Bluetooth (BT) radio. The first and second audio signals can be sent from the radio relay station to the first and second mobile devices using a Bluetooth (BT) radio.

In some embodiments, the relay control signals can be sent to the base unit from the radio relay station using a Radio Frequency for Consumer Electronics (Zigbee RF4CE) standard protocol. In these embodiments, the first and second audio signals can be sent to the base unit from the radio relay station using a Digital Enhanced Cordless Telecommunications (DECT) standard protocol.

In some embodiments, the radio relay station can further comprise a third radio to send and receive audio signals to and from the base unit and a fourth radio to send relay control signals to the base unit.

In some embodiments, the first, second, third and fourth radios can be on a common circuit board with first and second opposed sides. In these embodiments, the first radio can be positioned adjacent to the first side of the circuit board and the second radio can be positioned adjacent to the second side of the circuit board. The third radio can be positioned in a central section of the circuit board that is further from the first side than the first radio and further from the second side than the second radio, such as at a location that is approximately halfway between the first and second sides. The fourth radio can also be positioned in a section of the circuit board that is between the first and second sides, such as further from the second side than the second radio and further from the first side than the first radio, but, for example, nearer to the second side than the first side. The circuit board can have opposed third and fourth sides and the fourth radio can be adjacent to the third side and further from the fourth side than the third radio.

In another representative embodiment, a method for transmitting audio signals to and receiving audio signals from at least one remote audio source and for transmitting and receiving audio and control signals to and from at least first and second mobile devices can comprise wirelessly coupling the first mobile device to a first radio via a first control data pathway through which first control signals are wirelessly transmitted to and received from the first mobile device and wirelessly coupling the second mobile device to the first radio via a first audio pathway through which audio signals are wirelessly transmitted to and received from the second mobile device. The method can further comprise wirelessly coupling the second mobile device to a second radio via a second control data pathway through which second control signals are wirelessly transmitted to and received from the second mobile device and wirelessly coupling the first mobile device to the second radio via a second audio pathway through which audio signals are wirelessly transmitted to and received from the first mobile device. The method can further comprise delivering control signals to the second mobile device through the second control data pathway to block the transmission of control signals from the second mobile device to the second control data pathway and to block the transmission of audio signals from the second mobile device to the first audio pathway at least during a portion of a time that the first mobile device is receiving audio signals through the second audio pathway from the at least one remote audio source and recording the received audio signals from the at least one remote audio source, and delivering control signals to the first mobile device through the first control data pathway to block the transmission of control signals from the first mobile device to the first control data pathway and to block the transmission of audio signals from the first mobile device to the second audio pathway at least during a portion of a time that the second mobile device is receiving audio signals through the first audio pathway from the at least one remote audio source and recording the received audio signals from the at least one remote audio source.

In some embodiments, the method can further comprise delivering control signals to the second mobile device through the second control data pathway to block the transmission of control signals from the second mobile device to the second control data pathway and to block the transmission of audio signals from the second mobile device to the first audio pathway at least during a portion of a time that the first mobile device is transmitting audio signals through the second audio pathway to the at least one remote audio source. In these embodiments, the method can further comprise delivering control signals to the first mobile device through the first control data pathway to block the transmission of control signals from the first mobile device to the first control data pathway and to block the transmission of audio signals from the first mobile device to the second audio pathway at least during a portion of a time that the second mobile device is transmitting audio signals through the first audio pathway to the at least one remote audio source.

DETAILED DESCRIPTION

Figure 1:
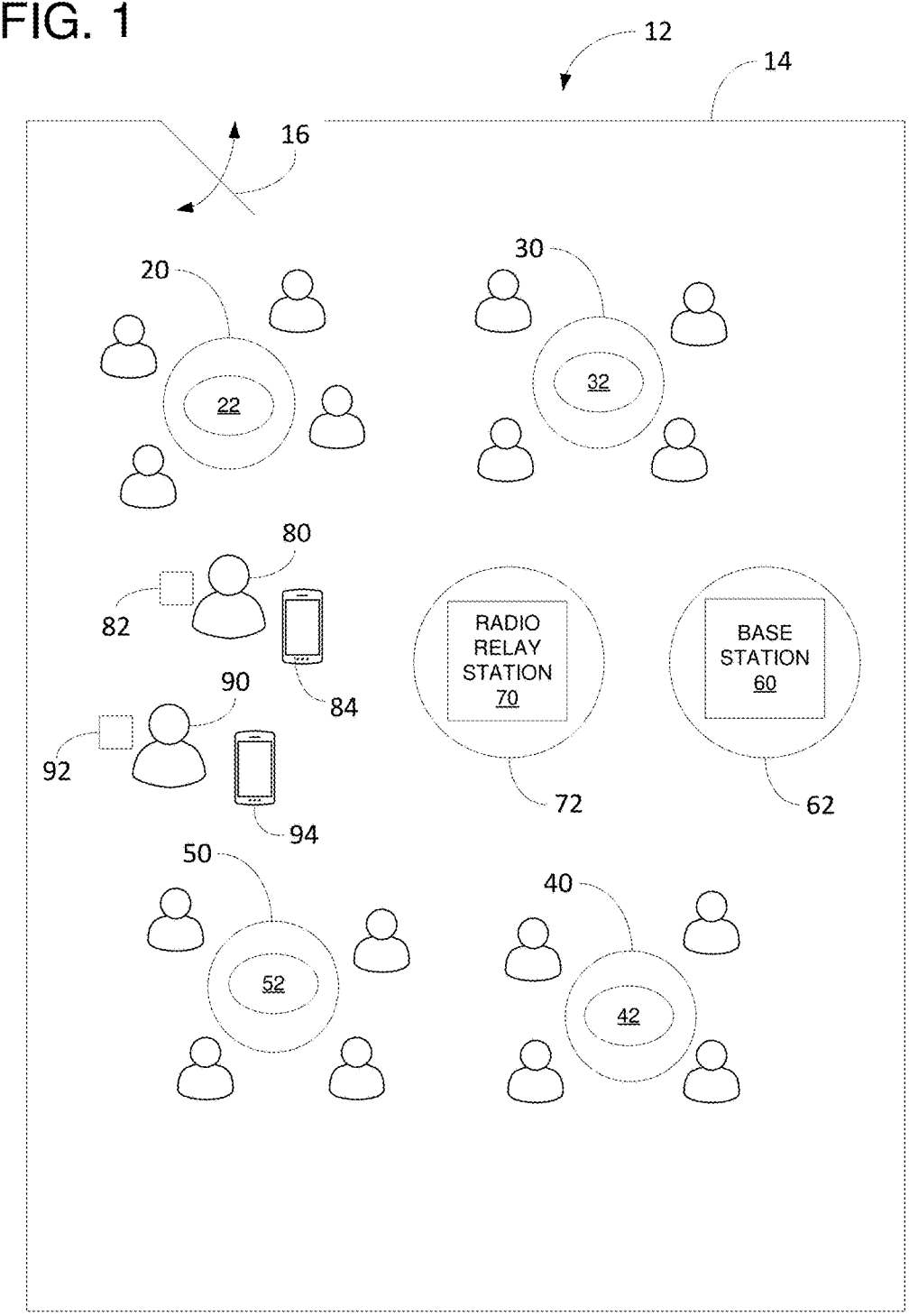
FIG. 1 illustrates an exemplary classroom system.

The description proceeds with reference to a number of exemplary embodiments, which are not to be viewed as limiting the scope of the invention. It should be noted that the invention is directed to novel and non-obvious aspects of the system and methods implemented by the system both alone and in sub-combinations with one another. In addition, the invention also encompasses novel and non-obvious aspects of individual system components.

For purposes of this description, the terms instructor and teacher are to be broadly construed to mean not only teachers in a classroom, but other individuals, such as individuals who are overseeing or directing an event such as a workshop, lecture, or other activity such as where attendees in the room are broken up into a plurality of small groups. The term classroom includes such other environments beyond a traditional classroom for elementary, high school or college students. Thus, individuals such as leaders, emcees, directors, overseers and other individuals fall under the definition of instructor even if they are not technically teaching or providing instruction to attendees. In the same manner, the term student or students are to be broadly construed to include any individuals who are involved in using a system. However, a distributed audio system has particular applicability to a classroom learning environment where both distributed and large group teaching of students in a classroom is taking place. To the extent the examples described herein are referring to a classroom or teaching environment, this is to be desirable, but not a limitation on the applicability of the system.

In this disclosure the words "a" and "an" are to be construed to include the singular and the plural unless otherwise stated such as by using the word only. Thus, if there are a plurality of particular elements, there is also "a" or "an" of the particular elements. In addition the phrase "coupled to" encompasses direct connection elements as well as indirect connection of elements through one or more other elements. Also, the term blocked with reference to audio pathways simply means that audio information does not pass along the pathway, whether a physical path is interrupted or audio information is not flowing through the path. Also, pathways can include, but are not limited to path, such as RF frequency channels or channels between Bluetooth® connected devices, but can also include data flow paths such as where data passes along a common path with the data being coded or otherwise separable with the separated data being deemed to have passed along a respective associated pathway. Audio pathways also include audio links between components. A control data pathway or an audio pathway can comprise two separate channels, one channel for transmitting data with a transmitter and one for receiving data with a receiver. Alternatively, a control data pathway or an audio pathway can comprise a single channel for both transmitting and receiving data with a transceiver.

The phrase "at least during a portion of a time" that a particular event occurs can mean the entire time that the event occurs, or a time period beginning before or after the event begins, extending during a portion of time that the event occurs, and ending before or after the event ends. The phrase "each element includes" does not preclude the presence of other similar elements that lack some of the components specified by the phrase "each element includes" as the other similar elements would not be within the phrase "each element includes" if it lacks some of the included items. As a specific example, the phrase each speaker unit of a system includes a speaker and a transmitter does not preclude the existence of speakers in the system without transmitters as the speakers without transmitters would not in this example be speaker units. Also, the term "and/or" is to be broadly construed to include "and", "or" and both "and" and "or".

The phrase "mobile device" as used in this application means a device that can be carried from place to place by a user and one that is capable of recording audio information, or playing back audio information, or both recording and playing back audio information; that is capable of transmitting audio information, receiving audio information or both transmitting and receiving audio information; with the transmission and receipt of audio information being accomplished at least wirelessly, such as using Bluetooth® enabled protocols. More desirably, such mobile devices are capable of sending and receiving both audio and video information, storing audio and video information, playing back audio and video information, and transmitting audio and video information at least wirelessly. Examples of mobile devices include: (i) smart phones such as models of IPHONES® from Apple Inc., and models of GALAXY® phones from Samsung Electronics Co., Ltd., (ii) tablet computers such as models of IPAD® from Apple Inc., and models of Surface® from Microsoft Corporation; (iii) personal digital assistants such as models of PalmPilot® from Palm, Inc.; (iv) lap top computers. Desirably the mobile devices 102, 104 are handheld devices making them readily portable.

First and second signals correspond to one another if all, substantially all, or at least a majority of the content of the signals is found in each of the signals. Thus, for example, during transmission through various components, audio signals correspond to one another even though formatting, some content, and manners of transmission are changed.

By way of example, Distributed Audio Systems (DAS) are meant to facilitate newly emerging teaching methodologies which redefine the way teachers and students interact within the classroom. In this new environment, teachers balance whole-group instruction with managing several small groups of students by orchestrating instructional and collaborative activities. The dispersal of the students into separate groups places a greater demand on teachers to be more mobile and better able to redirect their attention across a wider field. A DAS allows the teacher to provide basic learning and setup instructions for small group activities and desirably then to selectively monitor and address each group individually. Furthermore, this can be done without the teacher needing to be in close proximity (e.g. the teacher can be across the room from) a selected group.

Small group instruction can be used to group students together based on similar academic skills or learning styles so that they are essentially equal in their development and can digest content at the same rate or level. In a classroom, there are typically students at different levels of ability in a subject. In a math lesson for example, some groups might be just learning the basic parts of fractions, while other groups might be working on complex story problems to apply their understanding of fractions to real life situations. Another way to group students would be a hybrid of students at different levels. This would be more of a peer-to-peer instruction model where perhaps those at higher levels help others. This can also be effective as students can often learn better from their peers and the teaching of content can lead to mastery.

One of the largest challenges with small group instruction is the management of classroom activities and ongoing assessment of the students. DAS embodiments can allow the teacher immediate audio access to all students in the class, both for monitoring and directing student activity.

A typical classroom setup might be structured in the following way:
 a. 35% of the day=whole group; 65%=small group.
 b. 1 teacher is most common—there are cases where there might be an assistant, volunteer, or subject specialist off and on.
 c. 3-5 student groups located at stations in the room.
 d. Additional students might be doing individual work like silent reading, guided activities on a computer, or independent worksheets.
 e. Students sometimes rotate from station to station. The stations could be large tables, small desks pushed together, or a carpeted area on the floor.
 f. Depending on teaching-styles or subject matters the teacher could be doing any of the following:
  i. Staying in one station with the students rotating to the teacher
  ii. Rotating to the different stations throughout a lesson to work with each of the groups
  iii. Roaming the classroom helping individual groups as they need it, and assessing the activities DAS embodiments desirably comprise multiple portable speaker units that can be placed with each individual group in the classroom. The teacher desirably has a microphone and control that will help manage the activities in the classroom. DAS can give the teacher the ability to address any of plural different groups individually (for example, six such groups of six speaker units are included in one illustrated system) regardless of where she/he is located, so as not to disturb the entire class. The teacher can monitor small group activities to assess the learning and redirect when necessary. When the teacher needs to address the full class, she/he can do so by talking to all speaker pods in the classroom. More so than an audio system, DAS can become a classroom management tool that can allow a teacher to facilitate a small-group learning environment.

It is also desirable to be able to selectively record audio information from any of the classroom groups, such as for later analysis of the effectiveness of the teaching methods and the students' grasps of the subject matter. In addition, it is desirable to be able to playback audio, from, for example a remote source to one or more selected groups of students. The audio can be played back with accompanying video displayed on a television or other display visible by the group of students to which the audio is directed or to an entire classroom. For example, it is desirable for a mobile device to access information over a wireless internet connection, such as a YouTube® audio/video presentation or a Ted Talks® presentation and present this to the students. It is also desirable for each instructor in a classroom (such as two or more instructors) to be able to wirelessly control the system using a mobile device. During recording by one of the mobile devices or playback by or through one of the mobile devices, the other mobile device or devices can be blocked from transmitting information that can interfere with the recording or playing back of information by or through the said one of the mobile devices.

Key highlights of this approach include one or more, and desirably all, of the following:
 Teacher can audibly address any one of the groups individually.

When the teacher is providing direct instruction to one group, the speaker pod provides improved speech intelligibility in an often noisy environment.

Two way communication between small groups and the teacher allows for quick conversations.

Teacher can address all pods at once to allow for whole group instruction.

Teacher monitoring of all small groups from anywhere in the classroom.

Teacher can monitor groups without them knowing—behavior does not change.

Allows for continuous, ongoing assessment.

Student microphone at each group, eliminating the need and inconvenience of a pass-around microphone—one pod can broadcast to all pods.

Allows for plural (e.g. two) teacher microphones to work in one classroom.

Allows for at least two mobile devices that can be operated by separate instructors to remotely control the system.

Allows for the mobile devices to selectively record audio information from one or more student groups or pods and playback audio to one or more pods.

Reduces interference by blocking out transmission of information by all but one of the mobile devices during recording or playing back of audio information by or through said one of the mobile devices.

Allows for control of the system using radio control signals and the passage of audio data wirelessly by way of radios.

With reference to FIG. 1, a classroom 12 is shown bounded by a wall 14 and having a door 16. Within the classroom a plurality of groups of students are gathered about different tables, four such tables being shown in FIG. 1 and labeled with the numbers 20, 30, 40, and 50. As an example, four students are shown seated at each table. Of course, the number of students per group can be varied as well as the number of groups. In a typical distributed learning environment, there will be at least two separate groups.

Loosely placed on each table is a respective speaker unit, with speaker unit 22 being placed on table 20, speaker unit 32 being placed on table 30, speaker unit 42 being placed on table 40, and speaker unit 52 being placed on table 50. These speaker units are alternatively designated as pods 1-4 in this disclosure and are sometimes also referred to herein as speaker pods. The speaker units are desirably portable and, although they may be detachably mounted to a table for security reasons, they are more desirably simply resting on a support, such as a table, without any fasteners.

The speaker units desirably each comprise a speaker microphone, which can be a plurality of microphones. Desirably the speaker unit microphone, or microphones if a plurality of microphones are included in a speaker unit, have a limited range to pick up sound only from the immediate vicinity of the speaker unit, such as within about three to four feet of the speaker unit. These speaker units desirably further comprise a wireless speaker unit transmitter. Each of these transmitters can transmit audio signals corresponding to the audio detected or picked up by a corresponding speaker microphone. In addition, the speaker units also desirably each comprise a wireless speaker unit receiver for receiving audio information signals, and a speaker unit speaker for broadcasting audio corresponding to the audio information received by the speaker unit receiver to students in the vicinity of the speaker unit. The transmitters and receivers can be provided in the speaker units and in other components of the present system as transceivers. It should be noted that a classroom may be equipped with other speakers that lack transmitters, but such other speakers even if present would not be deemed a speaker unit. In a classroom setting, desirably at least a plurality of speaker units are located in the same room. In one example, the speaker units are constructed as disclosed in U.S. Pat. No. 8,861,744, which is incorporated herein by reference.

A base unit or base station 60 is shown in FIG. 1 positioned on a table 62 in the room 12. The base unit 60 can be loosely resting on the table 62, although less desirably it can be fastened in place. The base unit 60 can be wall mounted or otherwise positioned for receiving and transmitting control signals and audio information along control data pathways and audio pathways to the various components of the system. The illustrated base unit 60 comprises a wireless base unit receiver and a wireless base unit transmitter. In a typical system, more than one wireless receiver and wireless transmitter can be included in the base unit. These receivers and transmitters can be provided in the form of transceivers. Audio signals from the speaker units can, in response to control signals, flow along an audio pathway or audio link from a speaker unit transmitter to the base unit receiver and from the base unit transmitter to other wireless receivers in the system such as a radio relay station 70. There also can be a plurality of base units in a room. In one example, the base unit is constructed as disclosed in U.S. Pat. No. 8,861,744

A radio relay station 70 is shown in FIG. 1 positioned on a table 72, such as near a central location in the room 12. The radio relay station 70 can be loosely resting on the table 72, although less desirably it can be fastened in place. The radio relay station 70 can be wall mounted or otherwise positioned for receiving and transmitting audio information along audio links or pathways to the various components of the system. The illustrated radio relay station 70 is described in further detail below in connection with FIGS. 2 and 3. The radio relay station and base station can be integrated together and provided, for example, in a common housing.

FIG. 1 illustrates two instructors 80, 90 in the room 12 with instructor 80 being designated a teacher and instructor 90 being designated an assistant. The teacher 80 is equipped with an instructor unit 82. The instructor unit 82 can comprise an instructor unit speaker such as an ear bud speaker mounted to a headset for insertion into a teacher's ear. The instructor unit 82 also desirably comprises an instructor unit microphone. The instructor unit microphone can comprise a pendant supported microphone, be clipped or otherwise coupled to the teacher's clothing, be supported by a boom portion of the headset, or otherwise positioned to pick up (detect) audio from the instructor. In addition, the instructor unit 82 can comprise a base portion that can be worn on the instructor's belt as a belt pack or otherwise. The base portion of the instructor unit 82 desirably comprises a housing with a wireless instructor unit receiver and a wireless instructor unit transmitter, which can be provided as a transceiver. The teacher 80 can also be equipped with a mobile device 84 that can be used to control the operations of certain components as described herein. In the same manner, the teacher's assistant 90 can have an instructor unit 92 and a mobile device 94. In one example, the instructor units 128, 130 are constructed as described in U.S. Pat. No. 8,861,744.

Figure 2:
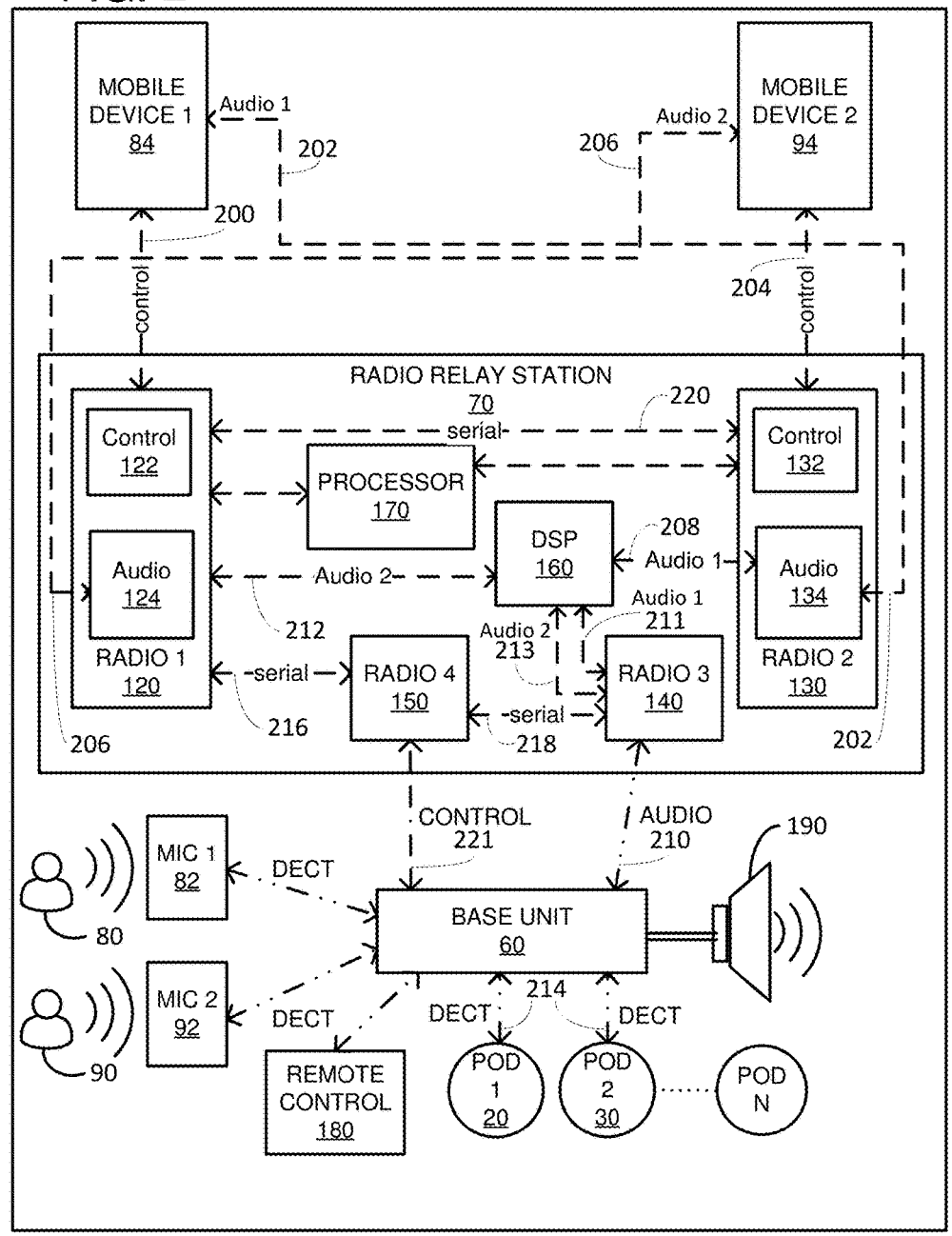
FIG. 2 shows a block diagram of an exemplary system.

FIG. 2 shows a block diagram of an exemplary classroom system 100 that can be used in the classroom 12 of FIG. 1. The system 100 can comprise the first and second mobile devices 84, 94, the base unit 60, radio relay station 70, the first and second instructor units 82, 92, and pods 20, 30, through the Nth pod (with N being the number of pods in the system, such as for example, twelve. These pods were described above in connection with FIG. 1. In some examples, the system 100 further comprises a remote control 180 that can be used to control certain operations of the system as described herein. In some examples, the system 100 further comprises a classroom speaker 190 connected to the base unit 60 that can be used to broadcast audio received by the base unit to an entire classroom 12. In some examples, the system 100 further comprises a remote control 180 that can be used in addition to, or in lieu of the first and/or second mobile device 84, 94. In some examples, the instruct 80 and the instructor 90 can each have a remote control 180. In some examples, the remote control 180 can be like the remote control described in U.S. Pat. No. 8,861,744.

In the example system 100 of FIG. 2, the radio relay station 70 can comprise a first radio 120, a second radio 130, a third radio 140, a fourth radio 150, a digital signal processing (DSP) unit 160 and a processor 170.

The first radio 120 and the second radio 130 can each be configured to receive control signals and audio signals from the first and second mobile devices 84, 94. In this example, the control signals from mobile device 84 (mobile device 1) are coupled to radio 120 (radio 1), and more specifically to a control signal transmitting and receiving portion 122 of radio 120, as indicated by a bi-directional control signal pathway 200. Also, audio signals from mobile device 84 are coupled to radio 130 (radio 2), and more specifically to an audio signal receiving and transmitting portion 134 of radio 130, by a bi-directional audio pathway 202. In addition, the control signals from mobile device 94 (mobile device 2) are coupled to radio 130 (radio 2), and more specifically to a control signal receiving and transmitting portion 132 of radio 130, as indicated by a bi-directional control signal pathway 204. Also, audio signals from mobile device 94 are coupled to radio 120 (radio 1), and more specifically to an audio signal receiving and transmitting portion 124 of radio 120, by a bi-directional audio pathway 206. Thus, the control and audio signal pathways are cross coupled in that control signals and audio signals from a given mobile device are coupled to two different radios. This reduces interference during operation of the system.

Looking first at the audio signal flow to and from mobile device 84 in this example, audio signals corresponding to the signals on audio 1 pathway 202 are coupled by a bidirectional audio pathway 208 to DSP 160 for conditioning the audio signals and routing the audio signals from the DSP to downstream system components (including radio 140) or to upstream system components (to radio 130 from radio 140 and then to mobile device 84) depending on the direction of the audio signal flow. Audio signals corresponding to the audio signals from mobile device 84 on audio pathway 202 pass from the DSP 160 via a bi-directional pathway 211 to radio 140 from which corresponding audio signals are transmitted to the base unit 60 along an audio pathway 210 and then are transmitted to one or more selected pods as audio signals along the respective bi-directional pathways 214 associated with the selected pods. In the reverse audio flow direction, audio signals from one or more selected pods are received by the base station 60, transmitted to radio 140 and then are passed to DSP 160 and to radio 130 and back to mobile device 84.

Looking next at the audio signal flow to and from mobile device 94 in this example, audio signals corresponding to the signals on audio 2 pathway 206 are coupled by a bidirectional audio pathway 212 to DSP 160 for conditioning the audio signals and routing the audio signals from the DSP to downstream system components (including radio 140) or to upstream system components (to radio 120 from radio 140 and then to mobile device 94) depending upon the direction of the audio signal flow. Audio signals corresponding to the audio signals from mobile device 94 on audio pathway 206 pass from the DSP 160 to radio 140 along bi-directional audio pathway 213. From radio 140, corresponding audio signals are transmitted to the base unit 60 along a bi-directional audio pathway 210 and then are transmitted as radio signals to one or more selected pods along the respective bi-directional pathways 214 associated with the selected pods. In the reverse audio flow direction, audio signals from one or more selected pods are received by the base station 60, transmitted to radio 140 and are then passed to DSP 160 and to radio 120 and back to mobile device 94.

Looking at the control signal flow to and from mobile device 84, the control signals are coupled via pathway 200 to radio 120. These control signals are also coupled to at least one other radio by a serial control signal pathway 216. In this example, a serial control signal pathway 216 is coupled to a control signal transmitting and receiving radio 150 and also via a serial control signal pathway 218 to the third radio 140 (pathway 218 can pass directly from radio 120 to radio 140 or indirectly through radio 150). Radio 150 can be eliminated in examples such as where the base unit 60 and the radio relay station 70 are integrated together, as in these examples, controls signals need not be wirelessly transmitted between the base unit and radio relay station because they are a single unit. In such a case, the radio 140 (the third radio) wirelessly communicates with the pods and can be a DECT radio. Radio 150 can also be eliminated if radio 140 has enough channels to pass all of the control signals along with the audio signals to and from the base unit 60. In a specific example where radio 140 is a DECT radio (as explained below) and the base unit is not integrated with the relay station, at the present time the number of available channels on a DECT radio is understood to be insufficient to transmit and receive all of the control signals. For this reason, an additional control signal transmitting and receiving radio 150, such as a Zigbee RF4CE radio, as explained below, is desirably used. In the illustrated example, control signals can be transmitted to base unit 60 by radios 140 and 150 along control signal pathway 221 and received from the base station by these radios along this pathway. These control signals can be used to control the pods (e.g. speaker, volume, selection and switching audio pathways to selected pods and/or to the base unit speaker, audio volume adjustments such as at the selected pods, and microphone control of the selected pods). These control signals received by the relay station can also be used to control various functions of the mobile devices (e.g., causing images or messages to be displayed on the mobile devices, causing the display of indications at the mobile devices of pods and/or modes of operation that have been selected). Control signals from mobile device 94 in this example pass via pathway 204 to radio 130 and pass via a bidirectional serial pathway to radio 120 and then pass as explained above for control signals from mobile device 84. It is to be understood, that the exemplary pathways can be rerouted, changed in character and otherwise modified from the example described above.

In the illustrated examples, the first, second, third, and fourth radios 120, 130, 140, 150 can use Bluetooth® to send and receive signals, as described below. Other radio signal transmission protocols, instead of Bluetooth® can be used to send control signals and audio signals.

The first radio 120 can, for example, comprise a Bluetooth® Low Energy (BLE) transceiver 122 for receiving and transmitting the control signals and a Bluetooth® (BT) Audio transceiver 124 for receiving and transmitting audio signals. The second radio 130 can also comprise a Bluetooth® Low Energy transceiver 132 for receiving and transmitting control signals and a Bluetooth® (BT) Audio transceiver 134 for receiving and transmitting audio signals. In some examples, the BLE transceivers 122, 132 and the BT audio transceivers 124, 134 can each comprise a separate transmitter and receiver. As a specific example, the first and second radios can be TICC2564C Bluetooth® modules from Texas Instruments Incorporated.

Figure 6:
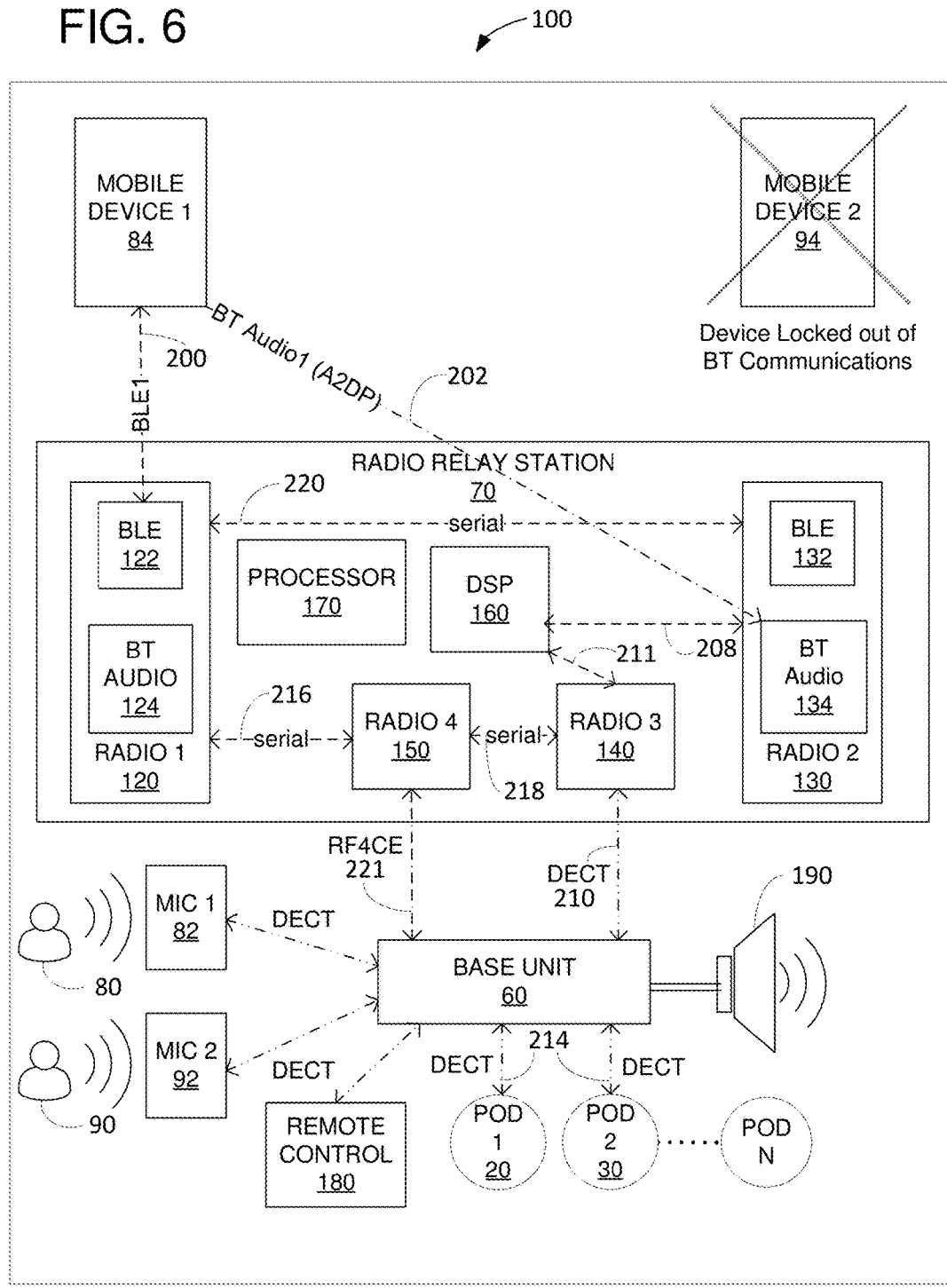
FIG. 6 shows another block diagram of an exemplary system with a mobile device (e.g. mobile device 2) locked out from communication with the radio relay station during playback of audio by or through a different mobile device (e.g. mobile device 1).
Figure 8:
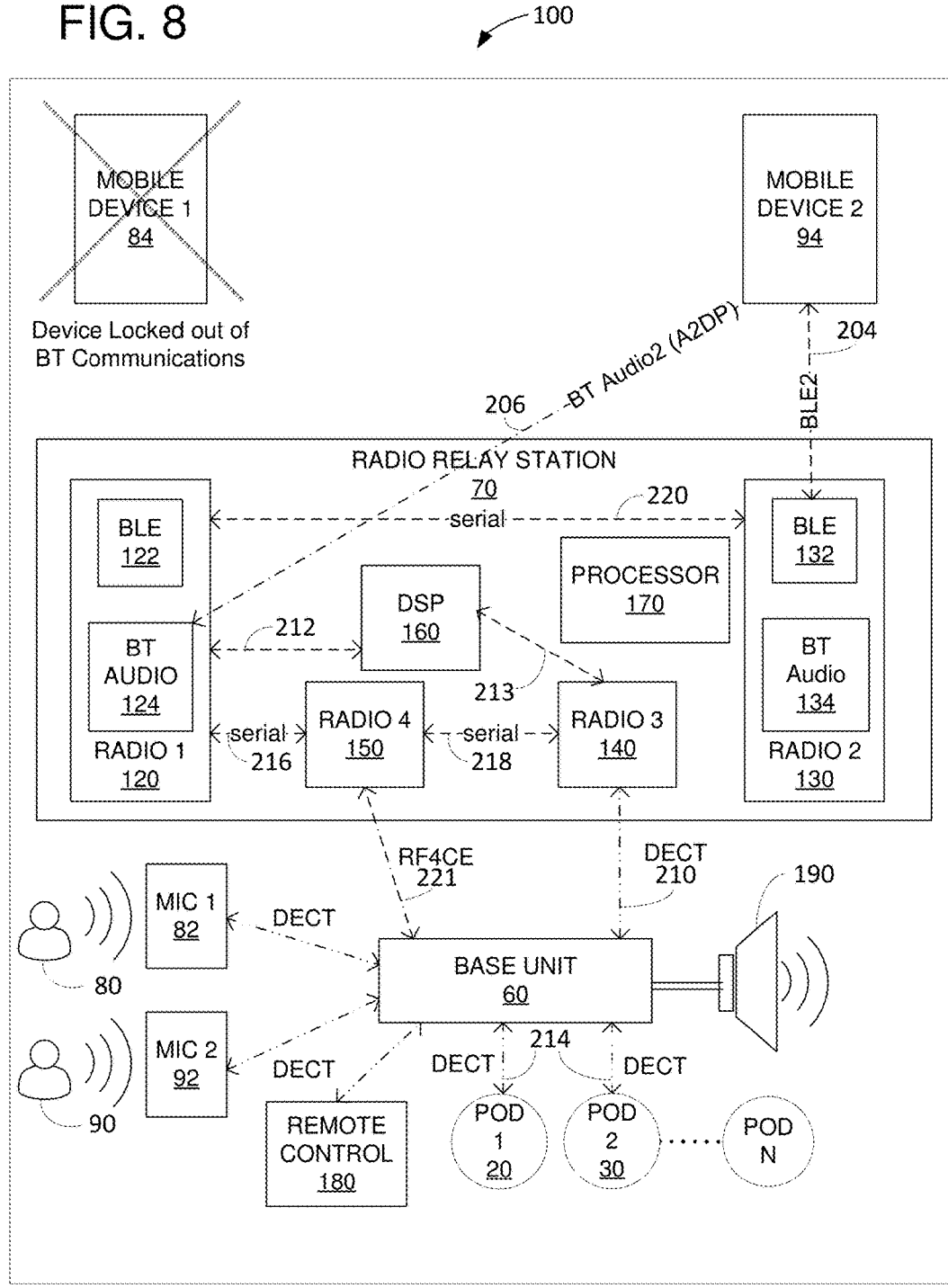
FIG. 8 shows another block diagram of an exemplary system with a mobile device (e.g. mobile device 1) locked out from communication with the radio relay station during playback of audio by or through a different mobile device (e.g. mobile device 2).

In this more specific example, as best understood with reference to FIGS. 6 and 8 (with the same numbers used for the pathways as in FIG. 2), the BLE transceiver 122 of the first radio 120 can couple to the first mobile device 84 using the BLE protocol to establish a data control pathway 200 between the first mobile device and the first radio. The BLE transceiver 132 of the second radio 130 can couple to the second mobile device 94 using the BLE protocol to establish a data control pathway 204 between the second mobile device and the second radio. The BT audio transceiver 124 of the first radio 120 can couple to the second mobile device 94 using Bluetooth® protocol to establish an audio pathway 206 between the second mobile device and the first radio. The BT audio transceiver 134 can couple to the first mobile device 84 using Bluetooth® protocol to establish an audio pathway 202 between the first mobile device and the second radio 130. By having the mobile devices 84, 94 each establish a data control pathway with one of the radios 120, 130 and an audio pathway with the other radio, in effect creating cross connection pathways audio pathways to different radios, interference between the pathways can be minimized as discussed in further detail below in connection with FIG. 3.

The third radio 140 can send and receive audio signals to and from the base unit 60 via pathways 210 using, for example, the Digital Enhanced Cordless Telecommunications (DECT) standard. The fourth radio 150 can send and receive control signals to and from the base unit 60 via pathways 221 using, for example, the Radio Frequency for Consumer Electronics (Zigbee RF4CE) standard. Specific examples of the third radio is a DCX81 radio from DSPG Group, Inc. and of the fourth radio is a CC2531 radio from Texas Instruments, Inc. The DSP unit 160 can send and receive audio signals to and from the first radio 120, the second radio 130, and the third radio 140. The processor 170 can control the operation of the radio relay station 70 as described herein below. In some examples, the processor 170 can comprise multiple processors. In other examples, the processor 170 can be integrated with one or more of the first, second, third, and fourth radios 120, 130, 140, 150. The processor 170 may also be external to the radio relay station 70.

Figure 3:
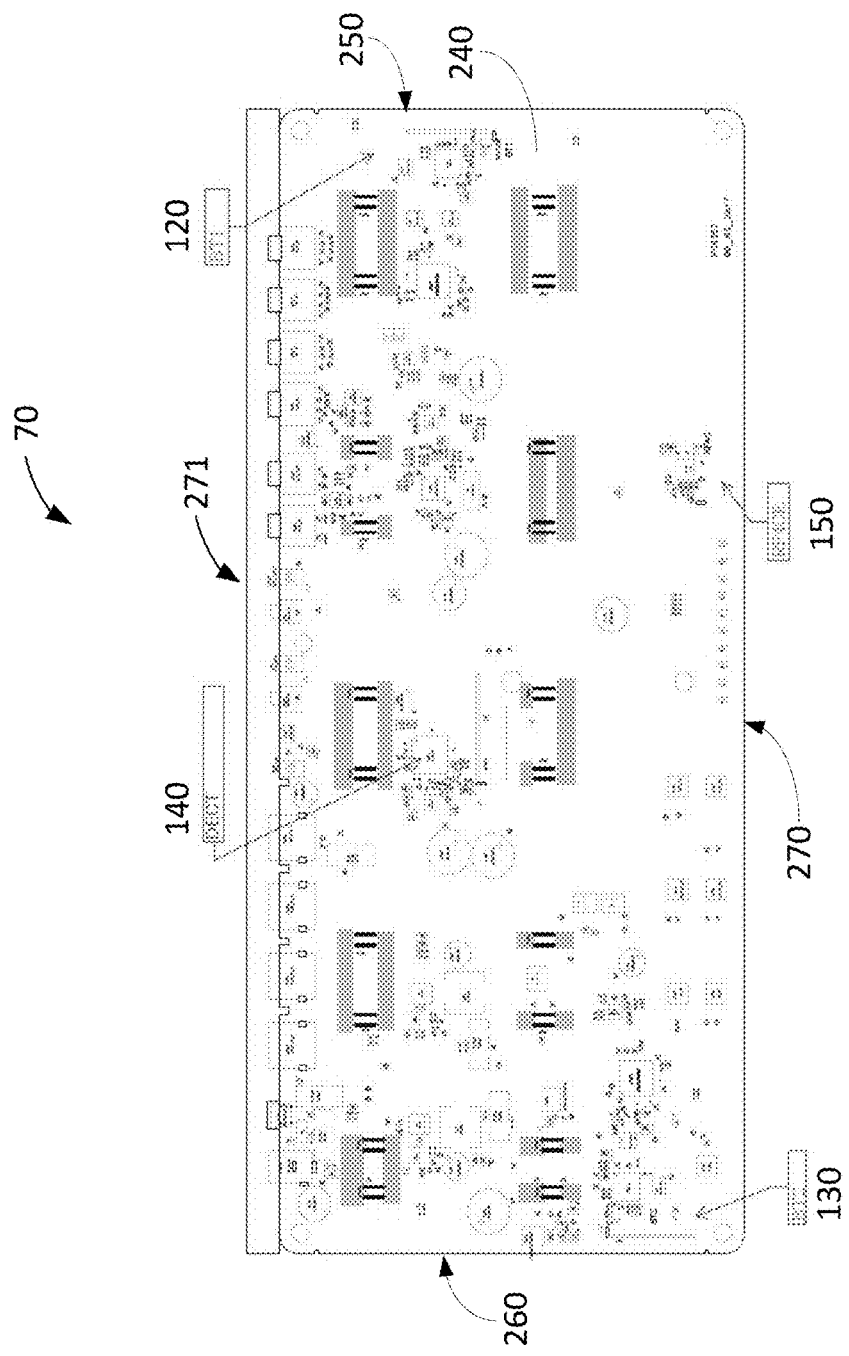
FIG. 3 illustrates an exemplary radio relay station circuit architecture.

FIG. 3 illustrates an exemplary architecture for the circuits comprising the radio relay station 70. As can be seen in FIG. 3, the radio relay station 70 can comprise a circuit board 240 containing the first radio 120, the second radio 130, the third radio 140, and the fourth radio 150. As discussed above, the first radio 120 and the second radio 130 each can send and receive both data signals and audio signals. The data signals can use BLE and the audio signals can use Bluetooth® Audio (BT), which both operate in the same 2.4 GHz band and can use the same frequencies. Therefore, if the BLE and BT signals are both received and processed by the same chip (e.g., an integrated circuit as illustrated in FIG. 3), the BLE data signals can interfere with and degrade the quality of the Bluetooth® Audio signals in this application. Accordingly, the highest quality audio reception and transmission can be achieved when data signals and audio signals are not processed by the same chip at the same time.

In the disclosed example, this is desirably accomplished by having the first mobile device 84 utilize a control data pathway with the first radio 120 and an audio pathway with the second radio 130 such that control signals from the first mobile device are processed by the first radio and audio signals from the first mobile device are processed by the second radio. Similarly, the second mobile device 94 utilizes a control data pathway with the second radio 130 and an audio pathway with the first radio 120 such that control signals from the second mobile device 94 are processed by the second radio and audio signals from the second mobile devices are processed by the first radio. Furthermore, when the first mobile device 84 is sending or receiving audio signals to or from the radio relay station 70, the second mobile device 94 is desirably locked out from sending control or audio signals to the radio relay station 70. Therefore, signals from the second mobile device to the relay station are blocked and do not interfere with audio signals being sent or received by the first mobile device; such as during recording of audio signals by the first mobile device or playing back of audio signals by or through the first mobile device. Similarly, when the second mobile device 94 is sending or receiving audio signals to or from the radio relay station 70, the first mobile device 84 is desirably locked out from sending control or audio signals to the radio relay station 70. Therefore, signals from the first mobile device to the relay station are blocked and do not interfere with audio signals being sent or received by the second mobile device; such as during recording of audio signals by the second mobile device or playing back of audio signals by or through the second mobile device. If the relay station has more than two radios coupled to respective mobile devices, desirably all but the one recording or playing back the audio signals is locked out. This locking out feature prevents the mobile devices 84, 94 from simultaneously transmitting audio signals to the radio relay station 70, which thereby prevents either the first radio 120 or the second radio 130 from receiving a data signal and an audio signal simultaneously. This reduces the interference between a BLE data signal and a Bluetooth® Audio signal on a single chip.

In order to further reduce the possibility of interference between the signals received by the first radio 120 and the second radio 130, the first and second radios are desirably spaced as far apart as is practical from each other on a circuit board, such as shown in FIG. 3. In the illustrated example of FIG. 3, the first radio 120 is placed adjacent to one edge 250 of the circuit board 200 and the second radio 130 is placed adjacent to the other opposed edge 260 of the circuit board. For example, the first and second radios can be placed within one inch of the side edges of the circuit board when a circuit board that is ten inches wide (from edge 250 to edge 260) is used.

The third radio 140, if a DECT radio, operates at a frequency of 1.9 GHZ. This operating frequency does not interfere with the operating frequency of either the first radio 120, the second radio 130, or the fourth radio 150. However, the third radio 140 can be susceptible to overload from an excessive signal level when the other radios are transmitting. Therefore, in the example of FIG. 3, the third radio 140 is placed in a central portion of the circuit board 200, for example halfway between the side edges, to maximize its distance from the first and second radios.

The fourth radio 150, if a Zigbee RF4CE radio, operates in a frequency band of 2.4 GHz. Desirably radio 150 uses different frequencies in the band and a different protocol than the first and second radios 120, 130. However, because radio 150 uses the same frequency band as radios 120, 130 the RF energy is desirably not suppressed with a filter before the RF input to radio 150. Accordingly, in the example of FIG. 3, the fourth radio 150 is placed between the first and second opposed side edges 240, 260 and in a central position of the circuit board 200 adjacent to the lower edge 270 (in FIG. 3) of the circuit board, that is opposed to an upper edge 271 of the circuit board, and approximately equal distance from the first and second radios. This positioning of radio 150 relative to radios 120 and 130 reduces the RF energy received by the third radio from the first and second radios in comparison to positioning the radio 150 nearer to either of the first or second radios.

The system 100 can be used in a variety of modes of operation including at least Remote, Playback, and Recording modes of operation, which are each discussed below. These modes of operation can be selected and controlled by instructors 80, 90 or others using mobile devices 84, 94. In the illustrated example, the mobile devices 84, 94 are smartphones that can run an app to control the system 100. The app can have a home screen that displays each of the available modes of operation to the user of the mobile device. The screen can use common touch control with the modes of operation selected by touching the appropriate icon on the home screen for the selection (e.g. to select record mode, playback mode, one or more specific pods selected from pods 20, 30, . . . N. [N pods being indicated in FIG. 2 with N being the total number of pods in a particular classroom system] from which audio is to be received or to which audio is delivered and other commands). Other input devices can be used, such as keypads or voice commands. In other examples, the mobile devices 84, 94 can be other types of devices as described above and can control the operation of the system 100 using control inputs from displays or other input devices.

One mode of operation of the system 100 is the Remote mode. In this mode of operation, the instructor 80 and/or the instructor 90 can remotely talk to students at one or more of the pods 20, 30, . . . N. In this mode of operation, the first mobile device 84 or the second mobile device 94 can be used to select one or more pods and a two-way audio pathway is opened between the first or second instructor units 82, 92 and the selected one or more pods. The teacher 80 and/or assistant 90 can then talk to the students (e.g. using the instructor microphones 82, 84 in FIG. 1) in the selected one or more pods through the opened audio data pathway. Because this mode of operation creates an audio pathway between an instructor unit and one or more pods through the base unit 60, no audio signals are transferred between the radio relay station 70 and either the first or second mobile devices 84, 94. Thus, both mobile devices can operate in Remote mode at the same time without creating potential interference as discussed above. Therefore, when one of the mobile devices is operating in Remote mode, the other mobile device or devices can continue to operate to without being locked out.

Figure 4:
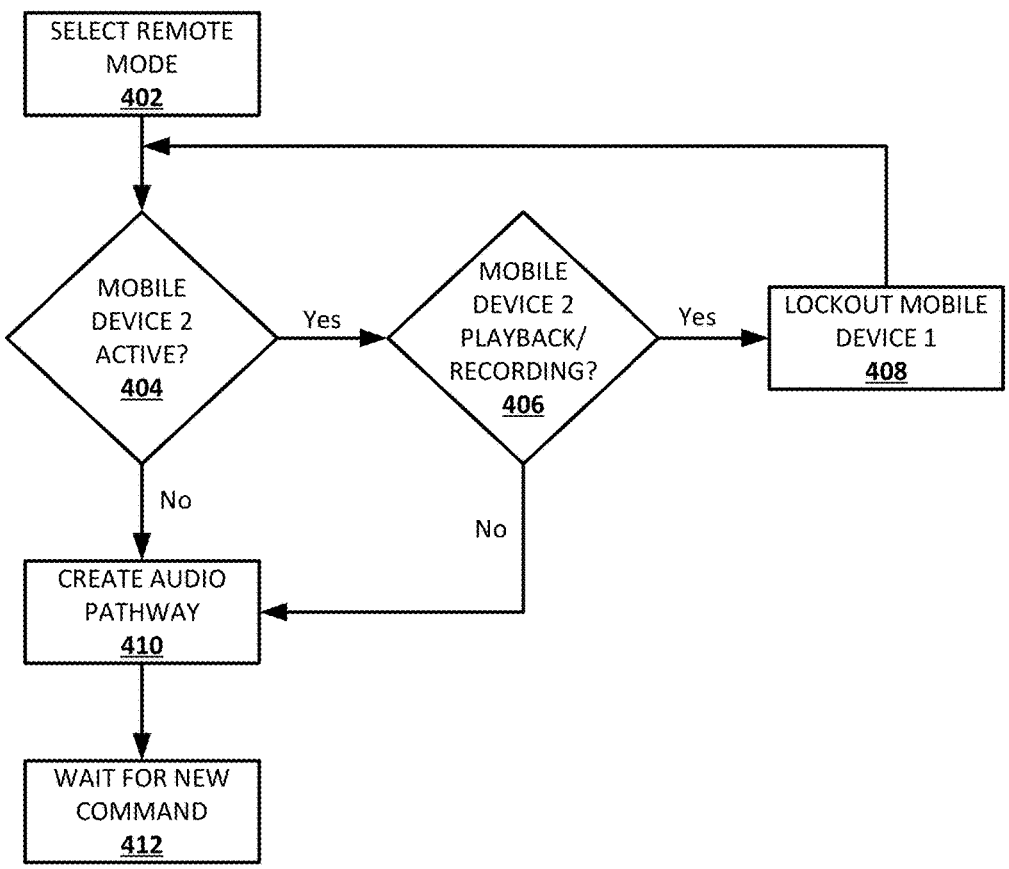
FIG. 4 is a flowchart illustrating an exemplary method of operating the system in a Remote mode.

FIG. 4 is a flowchart 400 depicting an example method of operating the system 100 in Remote mode with the first mobile device 84 and the first instructor unit 82. The same Remote mode operation can be used for the second mobile device 94 with mobile device 94 substituted for mobile device 84 in the process and vice versa, with this example being described in connection with FIG. 5 below. At process block 400, the instructor 80 uses the first mobile device 84 to select Remote mode and to select one or more pods. Appropriate control signals are then sent from the first mobile device to the BLE transceiver 122 of the first radio 120 to indicate that Remote mode was selected along with one or more pods 20, 30, . . . N and/or the classroom speaker 190. In the illustrated example, any number of pods can be selected using the first mobile device 84. In some examples, there is an option on the first mobile device 84 to select all pods. The instructor 80 can remotely communicate, using the instructor microphone of the instruction unit 82 (FIG. 1) with the selected pod or pods that are part of the system 100. In some examples, there is an option on the first mobile device 84 to select the classroom speaker 190 (e.g. FIG. 2), in which case the instructor 80 can speak to the entire classroom 12 through the speaker 190. In some examples, there is an option on the first mobile device 84 to select the instructor 90, in which case the instructor 80 can remotely speak to the instructor 90 using the microphone of instructor unit 82. In some examples, the instructor 80 can use remote control 180 (e.g. FIG. 2) instead of the first mobile device 84 to select Remote mode and to select one or more of the pods. In these examples, the control signals described being sent from the first mobile device 84 are sent from the remote control 180 instead.

In process block 404, after Remote mode is selected, the processor 170 determines whether the second mobile device 94 is active. That is, the processor 170 determines whether the second mobile device 94 is connected to the system 100. If the processor 170 determines that the second mobile device 94 is not active, control passes to block 410. If the processor 170 determines that the second mobile device 94 is active, control passes to block 406. In some examples, block 404 is omitted and the processor 170 does not determine whether the second mobile device 94 is active. In these examples, control passes from block 402 to block 406 where the processor 170 determines whether the second mobile device 94 is in either Playback or Recording mode, as described below. This can be desirable in some examples since, if the second mobile device 94 is no in either Playback or Recording mode, it does not matter whether or not it is active for purposes of this example.

In process block 406, the processor 170 determines whether the second mobile device 94 is in either Playback or Recording mode. If the second mobile device 94 is in one of these operating modes, then audio signals are being either sent between the second mobile device 94 and the first radio 120, as explained in further detail below in connection with FIGS. 6-12. Accordingly, if the second radio is in either Playback or Recording mode, then sending control signals from the first mobile device 84 to the first radio 120 could cause interference with the audio signals to or from the second mobile device 94, as explained above. Therefore, if the processor 170 determines that the second mobile device 94 is in one of these record or playback modes of operation, control passes to process block 408 to lockout the first mobile device 84. If the processor 170 determines that the second mobile device 94 is not in Playback or Recording mode, then control passes to process block 410. It should be noted that even if a mobile device is locked out, in a desirable approach, the remote control 180 can be used by the instructor with the locked out mobile device to continue to communicate via the base station 60 with selected pods.

In process block 408, the processor 170 causes the BLE transceiver 122 of the first radio 120 to send control signals to the first mobile device 84 to block the first mobile device from sending control signals or audio signals to the radio relay station 70, thereby locking out the first mobile device from communications with the radio relay station. In some examples, these control signals also cause the first mobile device 84 to display a message to indicate that the device is locked out because of the activity of the second mobile device 94 (e.g., "Playback in progress" if the second mobile device is in Playback mode of "Recording in progress" if the second mobile device is in Recording mode). Control then returns to process block 404 such that the first mobile device 84 is prevented from entering Remote mode until the second mobile device 94 exits Playback or Recording Mode.

In process block 410, one or more audio pathways are created between the first instructor unit 82 and the selected one or more pods. Once these one or more audio pathways are created, any audio detected by the instructor unit microphone of the first instructor unit 82 is sent as audio signals from the first instructor unit 82 to the base unit 60 and from the base unit to the selected one or more pods, where the audio signals are broadcast by the speakers of the one or more selected pods. Additionally, any audio detected by the microphones at the selected one or more pods is sent from the pods to the base unit 60 and from the base unit to the first instructor unit 82 where it is broadcast to the speaker of the first instructor unit. Thus, these audio pathways desirably allow for two way communication between the first instructor 80 and the students at the one or more selected pods. The audio signals sent from the first instructor unit 82 to the base unit 60, from the base unit to one or more pods, from the pods to the base unit, or from the base unit to the first instructor unit can be sent using the DECT standard.

After the appropriate audio pathway or pathways are created in process block 410, control passes to process block 412. In process block 412, the audio pathways remaining open and the first mobile device 84 stays in Remote mode until a new command is entered on the first mobile device to either stop Remote mode or to enter another mode of operation.

Figure 5:
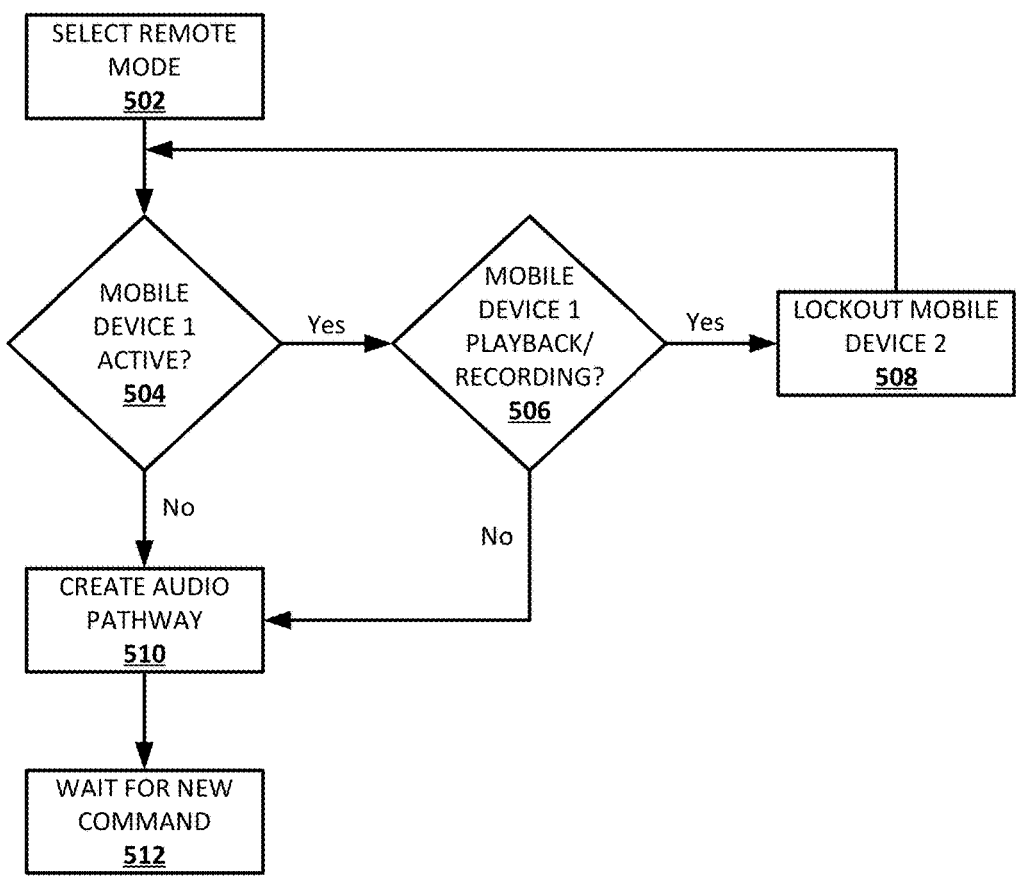
FIG. 5 is a flowchart illustrating another exemplary method of operating the system in a Remote mode.

FIG. 5 is a flowchart 500 depicting an example method of operating the system 100 in Remote mode with the second mobile device 94 and the second instructor unit 92. At process block 500, the instructor 90 uses the second mobile device 94 to select Remote mode and to select one or more pods and appropriate control signals are sent from the second mobile device to the BLE transceiver 132 of the second radio 130. Control then passes to process block 504.

In process block 504, after Remote mode is selected on the second mobile device 94, the processor 170 determines whether the first mobile device 84 is active. That is, the processor 170 determines whether the first mobile device 84 is connected to the system 100. If the processor 170 determines that the first mobile device 84 is not active, control passes to block 510. If the processor 170 determines that the first mobile device 84 is active, control passes to block 506.

In process block 506, the processor 170 determines whether the first mobile device 84 is in either Playback or Recording mode. If the processor 170 determines that the first mobile device 84 is in one of these modes of operation, control passes to process block 508. If the processor 170 determines that the first mobile device 84 is not in Playback or Recording mode, then control passes to process block 510.

In process block 508, the processor 170 causes the BLE transceiver 132 of the second radio 130 to send control signals to the second mobile device 94 to block the second mobile device from sending control signals or audio signals to the radio relay station 70, thereby locking out the second mobile device from communications with the radio relay station. In some examples, these control signals also cause the second mobile device 94 to display a message to indicate that the device is locked out because of the activity of the first mobile device 84. Control then returns to process block 504.

In process block 510, one or more audio pathways are created between the second instructor unit 92 and the selected one or more pods. Once these one or more audio pathways are created, any audio detected by the instructor unit microphone of the second instructor unit 92 is sent as audio signals from the second instructor unit 92 to the base unit 60 and from the base unit to the selected one or more pods, where the audio signals are broadcast by the speakers of the one or more selected pods. Additionally, any audio detected by the microphones at the selected one or more pods is sent from the pods to the base unit 60 and from the base unit to the second instructor unit 92 where it is broadcast to the speaker of the second instructor unit. Thus, these audio pathways desirably allow for two way communication between the second instructor 90 and the students at the one or more selected pods. The audio signals sent from the second instructor unit 92 to the base unit 60, from the base unit to one or more pods, from the pods to the base unit, or from the base unit to the second instructor unit can be sent using the DECT standard.

After the appropriate audio pathway or pathways are created in process block 510, control passes to process block 512. In process block 512, the second mobile device 94 stays in Remote mode and the audio pathways remain open until a new command is entered on the second mobile device to either stop Remote mode or enter another mode of operation.

Another mode of operation of the system 100 is Playback mode, wherein a selected media file stored on the first or second mobile device 84, 94 (or from another source) and the audio therefrom can be broadcast from one of the mobile devices to one or more selected pods. The selected media file can be a pre-recorded lesson, a song, a historical speech, or any type of media file that has audio. In some examples, the media file to be broadcast can be streamed live by the first or second mobile device 84, 94 and broadcast to the one or more selected pods. The selected media file can contain video in addition to audio, although only the audio portion of the media file will be broadcast through the exemplary radio relay station, unless video transmission capability is included in the relay station.

In the examples below, the control signals are described as BLE signals and the audio signals are described as Bluetooth® audio signals. It is to be understood that other forms of control and audio signals can be used.

Figure 7:
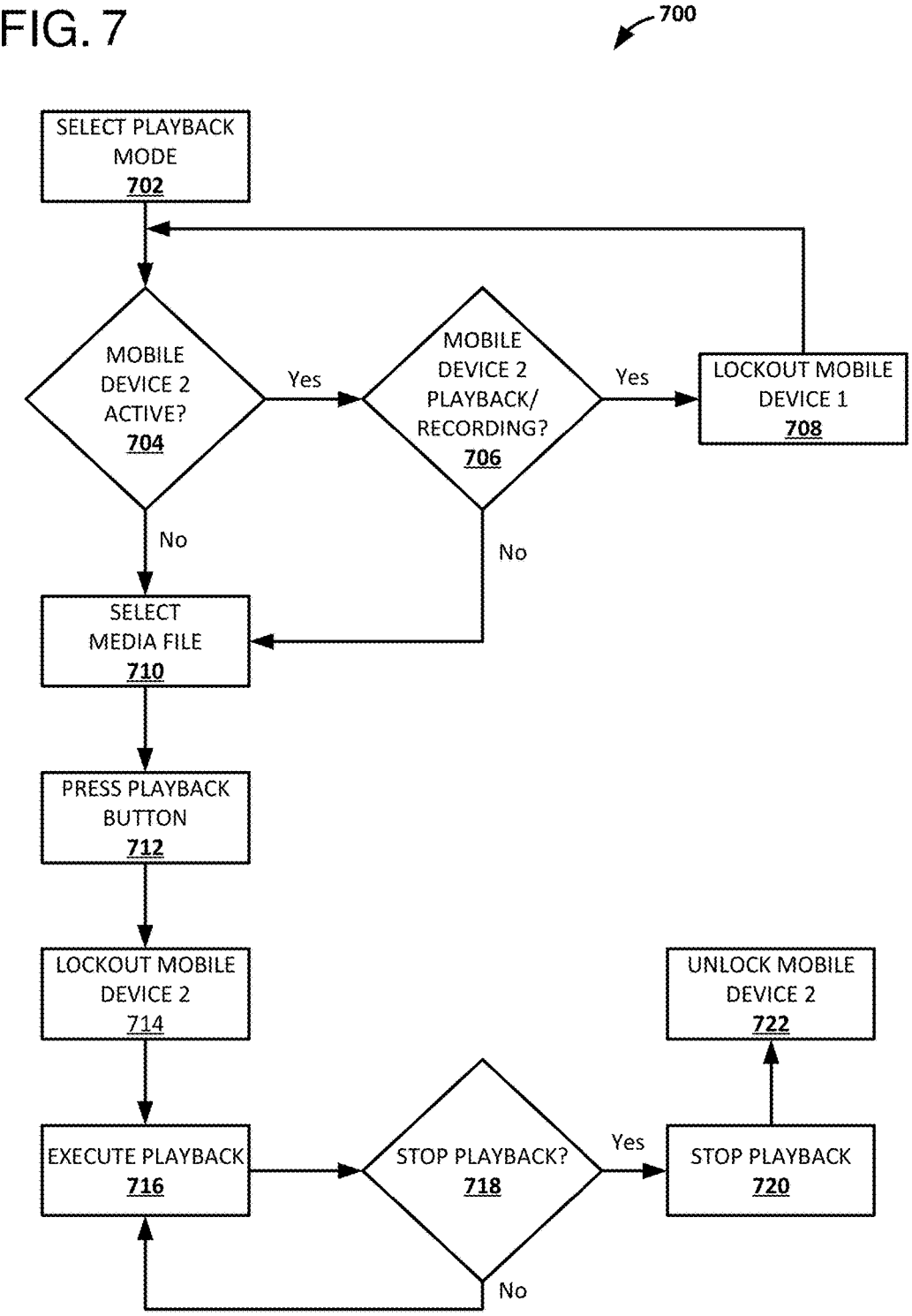
FIG. 7 is a flowchart illustrating an exemplary method of operating the system of FIG. 6 in a Playback mode.

FIG. 6 shows a block diagram of the system 100 along with illustrations of the transmission of audio and control signals between the components when Playback mode is selected on the first mobile device 84 and the second mobile device 94 is locked out from transmitting control and audio signals. FIG. 7 is a flowchart 700 depicting an example method of operating the system 100 when Playback mode is selected on the first mobile device 84.

In process block 702, the first instructor 80 uses the first mobile device 84 to select Playback mode and to select one or more pods to receive the playback. Appropriate control signals are then sent from the first mobile device 84 to the BLE transceiver 122 of the first radio 120 indicating that Playback mode is selected along with a selected one or more pods. Control then passes to process block 704.

In process block 704, after Playback mode is selected on the first mobile device 84, the processor 170 determines whether the second mobile device 94 is active. That is, the processor 170 determines whether the second mobile device 94 is connected to the system 100. If the processor 170 determines that the second mobile device 94 is not active, control passes to block 710. If the processor 170 determines that the second mobile device 94 is active, control passes to block 706.

In process block 706, the processor 170 determines whether the second mobile device 94 is in either Playback or Recording mode. If the processor 170 determines that the second mobile device 94 is in one of these modes of operation, control passes to process block 708. If the processor 170 determines that the second mobile device 94 is not in Playback or Recording mode, then control passes to process block 710.

In process block 708, the processor 170 causes the BLE transceiver 122 of the first radio 120 to send control signals to the first mobile device 84 to block the first mobile device from sending control signals or audio signals to the radio relay station 70, thereby locking out the first mobile device from communications with the radio relay station while the second mobile device 94 is a Playback mode. In some examples, these control signals also cause the first mobile device 84 to display a message to indicate that the device is locked out because of the activity of the second mobile device 94 (e.g., "Playback in progress" if the second mobile device is in Playback mode or "Recording in progress" if the second mobile device is in a Recording mode). Control then returns to process block 704 such that the first mobile device 84 is prevented from entering Playback mode until the second mobile device 94 exits Playback or Recording Mode.

In process block 710, the first instructor 80 uses the first mobile device 84 to select the media file to be played back or broadcast to the selected one or more pods. In the illustrated example, this selection can be made using an app running on the first mobile device 84 to select a file stored on the first mobile device 84. In other examples, other methods of selecting the media file can be used. Once the media file is selected for playback, control passes to block 712.

In process block 712, the first instructor 80 initiates playback, such as by touching an icon (e.g. a playback button icon) on a touch screen of the first mobile device 84 to begin playback of the media file. In the illustrated example, this can be done with a button that appears in the app running on the first mobile device 84 labeled 'Begin Playback' or a similarly descriptive word of phrase. In other examples, other methods of initiating playback can be used. After the instructor 80 has initiated playback of the media file, control passes to process block 714.

In process block 714, the processor 170 causes the BLE transceiver 132 of the second radio 130 to send control signals to the second mobile device 94 to block the second mobile device from sending control signals or audio signals to the radio relay station 70. This ensures that the second mobile device 94 is locked out of communication with the radio relay station 70 while the first mobile device 84 is in Playback mode to avoid interference between data and audio signals as described above. Control then passes to process block 716.

In process block 716, the system 100 begins the playback of the selected media file. In the illustrated example, the system 100 begins the playback of the selected media file shortly after the second mobile device 94 is locked out. In other examples, the system 100 can begin the playback of the selected media file at the same time the second mobile device is locked out or before the second mobile device is locked out. In the illustrated example, playback of the selected media file is accomplished by the first mobile device 84 sending an audio signal corresponding to the audio of the selected media file to the BT Audio transceiver 134 of the second radio 130, as indicated in FIG. 6. This audio signal can be sent using the Bluetooth® Advanced Audio Distribution Profile (A2DP), which allows for high quality audio to be transmitted over a Bluetooth® connection. As this audio signal is received by the BT Audio transceiver 134 of the second radio 130, the audio signal is sent from the BT Audio transceiver 134 to the DSP unit 160. The DSP unit 160 can then condition the audio signals and the audio signals can then be sent from the DSP unit 160 to the third radio 140. The third radio 140 then sends the audio signal to the base unit 60 using, in this example, the DECT standard.

In addition to transmitting the audio signal corresponding to the selected media file to the BT Audio transceiver 134 of the second radio 130, the first mobile device 84 also transmits control signals to the BLE transceiver 122 of the first radio 120. These control signals can indicate which pods are selected to receive the audio playback. In some examples, the selection of pods can be changed on the first mobile device 84 during playback of the media file. This can allow the first instructor 80 to add or remove pods that are hearing the media file playback without having to stop and restart the media file playback.

As the BLE transceiver 122 of the first radio 120 receives the control signals from the first mobile device 84, the first radio 120 sends control data, such as serial control data signals, to the fourth radio 150 indicating which pods have been selected to receive the playback. As the fourth radio 150 receives these control signals, the fourth radio sends corresponding control signals to the base unit 60 indicating which pods have been selected. In some examples, these controls signals are sent from the first radio 120 to the third radio 140 and from the third radio to the base unit using DECT. In these examples, the fourth radio can be eliminated from the system 100. However, there is a limit in current DECT technology to how many DECT links can be established at any given time. As such, because DECT links are used to send audio signals from the third radio 140 to the base unit 60, the number of allowable DECT links may be exceeded if the third radio also sent control signals to the base unit using DECT. Therefore, in the illustrated example, the fourth radio 150 can be an RF4CE radio that sends these control signals to the base unit 60 using the Zigbee RF4CE standard to avoid exceeding the allowable limit of DECT links.

After receiving the audio signal from the third radio 140 and the control signal from the fourth radio 150, the base unit 60 sends the received audio signal to one or more pods as indicated by the received control signal using the DECT standard. Each of the pods that receives this audio signal then plays the received audio signal through the pod speaker. Control then passes to process block 718.

In process block 718, the processor 170 determines whether the first instructor 80 has indicated that playback should stop. In the illustrated example, the first instructor 80 can stop playback of the selected media file such as by using an app running on the first mobile device 84 to press a button or icon that appears on the home screen of mobile device 84 during playback of the media file; for example the button can be labeled 'Stop Playback' or with a similar descriptive word or phrase. In other examples, other methods of indicating that playback of the media file should be stopped can be used. Once the first instructor 80 indicates that playback of the media file should stop, the first mobile device 84 sends control signals to the BLE transceiver 122 of the first radio 120 indicating as much. The first mobile device 84 can also send control signals indicating that playback of the media file should stop when the media file has finished playing.

When the first radio 120 receives a control signal from the first mobile device 84 indicating that playback of the media file should stop, the processor 170 determines that playback should be stopped and control passes to process block 720. If such a control signal is not received by the first radio, the processor 170 determines that playback should not be stopped and control returns to process block 716. In this manner, playback of the media file continues until the media file finishes playing or until the first instructor 80 (or someone else using mobile device 84) indicates that playback should stop.

In process block 720, the processor 170 causes the third and fourth radios 140, 150 to stop sending audio and control signals, respectively, to the base unit 60, thus stopping playback of the media file. Control then passes to process block 722.

In process block 722, the processor 170 causes the BLE transceiver 132 of the second radio 130 to send control signals to the second mobile device 94 causing the second mobile device to no longer be blocked from sending control or data signals to the radio relay station 70, thereby unlocking the second mobile device and once again allowing communication by mobile device 94 with the radio relay station.

Figure 9:
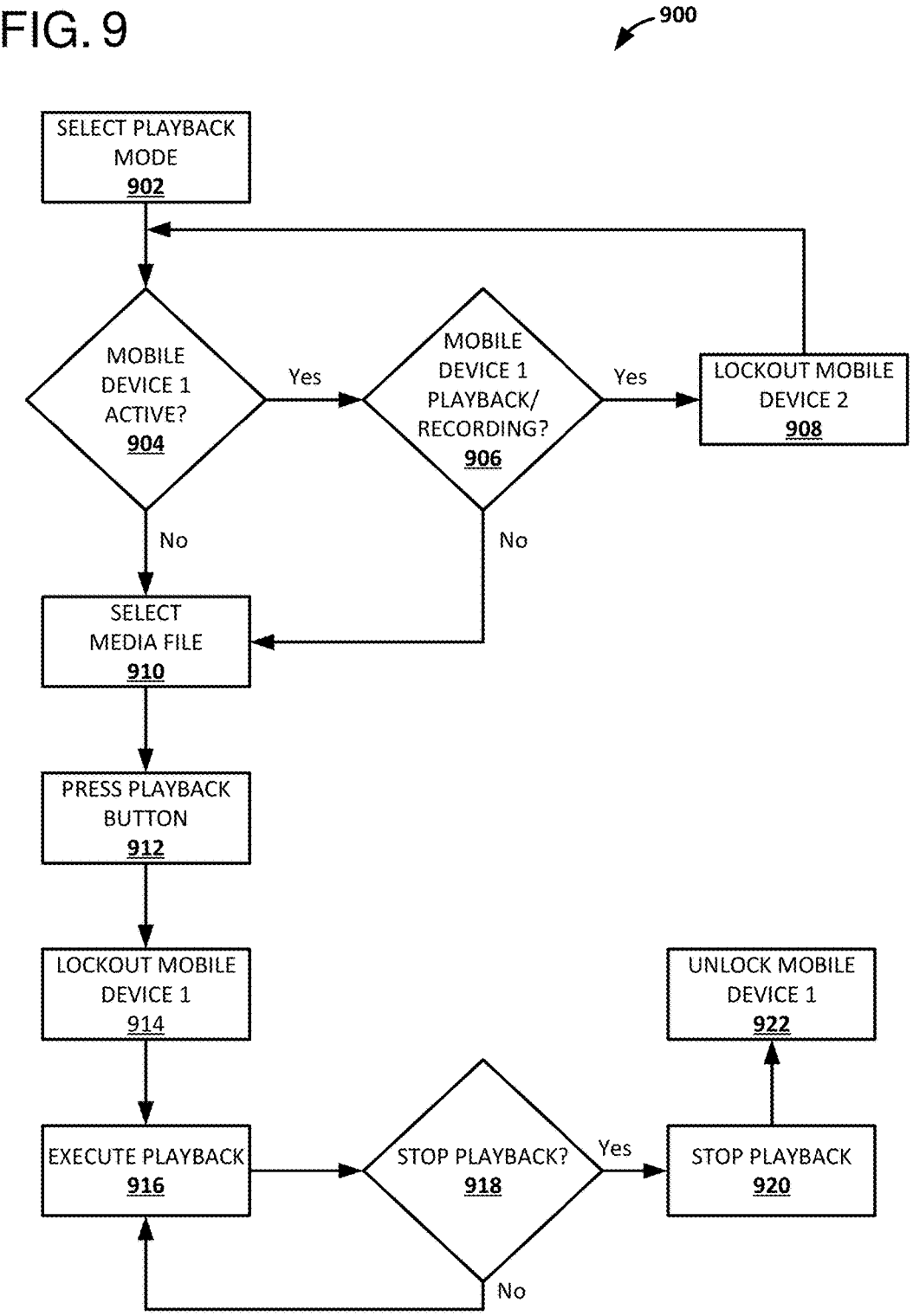
FIG. 9 is a flowchart illustrating an exemplary method of operating the system of FIG. 8 in a Playback mode.

FIG. 8 shows a block diagram of the system 100 along with illustrations of the transmission of signals between the components when Playback mode is selected on the second mobile device 94. FIG. 9 is a flowchart 900 depicting an example method of operating the system 100 when Playback mode is selected on the second mobile device 94.

In process block 902, the second instructor 90 uses the second mobile device 94 to select Playback mode and to select one or more pods to receive the playback. Appropriate control signals are then sent from the second mobile device 94 to the BLE transceiver 132 of the second radio 130 indicating that Playback mode is selected by the second mobile device 94 along with a selected one or more pods. Control then passes to process block 904.

In process block 904, after Playback mode is selected on the second mobile device 94, the processor 170 determines whether the first mobile device 84 is active. If the processor 170 determines that the first mobile device 84 is not active, control passes to block 910. If the processor 170 determines that the first mobile device 84 is active, control passes to block 906.

In process block 906, the processor 170 determines whether the first mobile device 84 is in either Playback or Recording mode. If the processor 170 determines that the first mobile device 84 is in one of these modes of operation, control passes to process block 908. If the processor 170 determines that the first mobile device 84 is not in Playback or Recording mode, then control passes to process block 910.

In process block 908, the processor 170 causes the BLE transceiver 132 of the second radio 130 to send control signals to the second mobile device 94 to block the second mobile device from sending control signals or audio signals to the radio relay station 70, thereby locking out the second mobile device from communications with the radio relay station while the first mobile device 84 is in either Playback or Recording mode. In some examples, these control signals also cause the second mobile device 94 to display a message to indicate that the device is locked out because of the activity of the first mobile device 84. Control then returns to process block 904 such that the second mobile device 94 is prevented from entering Playback mode until the first mobile device 84 exits Playback or Recording Mode.

In process block 910, the second instructor 90 uses the second mobile device 94 to select the media file to be played back or broadcast to the selected one or more pods. Once the media file is selected for playback, control passes to block 912.

In process block 912, the second instructor 90 presses a button (e.g. an icon) on the second mobile device 94 to begin playback of the media file. Control then passes to process block 914.

In process block 914, the processor 170 causes the BLE transceiver 122 of the first radio 120 to send control signals to the first mobile device 84 to block the first mobile device from sending control signals or audio signals to the radio relay station 70. This ensures that the first mobile device 84 is locked out of communication with the radio relay station 70 while the second mobile device 94 is in Playback mode to avoid interference between data and audio signals as described above. Control then passes to process block 916.

In process block 916, the system 100 begins the playback of the selected media file. This is accomplished by the second mobile device 94 sending an audio signal corresponding to the audio of the selected media file to the BT Audio transceiver 124 of the first radio 120, as indicated in FIG. 8. This audio signal can be sent using the Bluetooth® Advanced Audio Distribution Profile (A2DP), which allows for high quality audio to be transmitted over a Bluetooth® connection. As this audio signal is received by the BT Audio transceiver 124 of the first radio 130, the audio signal is sent from the BT Audio transceiver 124 to the DSP unit 160. The DSP unit 160 can then condition the audio signal and the audio signals can then be sent from the DSP unit 160 the third radio 140. The third radio 140 then sends the audio signal to the base unit 60 using the DECT standard.

In addition to transmitting the audio signal corresponding to the selected media file to the BT Audio transceiver 124 of the first radio 120, the second mobile device 94 also transmits control signals to the BLE transceiver 132 of the second radio 130. These control signals can indicate which pods are selected to receive the audio playback.

As the BLE transceiver 132 of the second radio 130 receives the control signals from the second mobile device 94, the second radio 130 sends serial data to the fourth radio 150 indicating which pods have been selected to receive the playback. As the fourth radio 150 receives these control signals, the fourth radio sends corresponding control signals to the base unit 60 indicating which pods have been selected using, for example, the Zigbee RF4CE standard if the fourth radio is an RF4CE radio.

After receiving the audio signal from the third radio 140 and the control signal from the fourth radio 150, the base unit 60 sends the received audio signal to one or more pods as indicated by the received control signal using the DECT standard. Each pod that receives this audio signal then plays the received audio signal through the pod speaker. Control then passes to process block 918.

In process block 918, the processor 170 determines whether a control signal has been received from the second mobile device 94 indicating that playback should stop. If the processor 170 determines that playback should be stopped, control passes to process block 920. If the processor 170 determines that playback should not be stopped, control returns to process block 916. In this manner, playback of the media file continues until the media file finishes playing or until the second instructor 90 (or someone else using mobile device 94) indicates that playback should stop.

In process block 920, the processor 170 causes the third and fourth radios 140, 150 to stop sending audio and control signals, respectively, to the base unit 60, thus stopping playback of the media file. Control then passes to process block 922.

In process block 922, the processor 170 causes the BLE transceiver 122 of the first radio 120 to send control signals to the first mobile device 84 causing the first mobile device to no longer be blocked from sending control or data signals to the radio relay station 70, thereby unlocking the first mobile and once again allowing Bluetooth® communication with the radio relay station.

Another mode of operation of the system 100 is Recording mode. In this mode, an instructor 80, 90 using the first or second mobile device 84, 94 can remotely communicate with students at one more pods and record the audio of this communication on the mobile device. This can allow the instructor to listen to this audio at a later time to see how students responded to a particular lesson, what problems different students were having, or for a variety of other reasons. This audio can also be used by a supervisor, for example, to evaluate the teaching effectiveness of an instructor. In some examples, the first or second mobile device 84, 94 can also capture still photos or record video along with the recorded audio, as described below.

Figure 10:
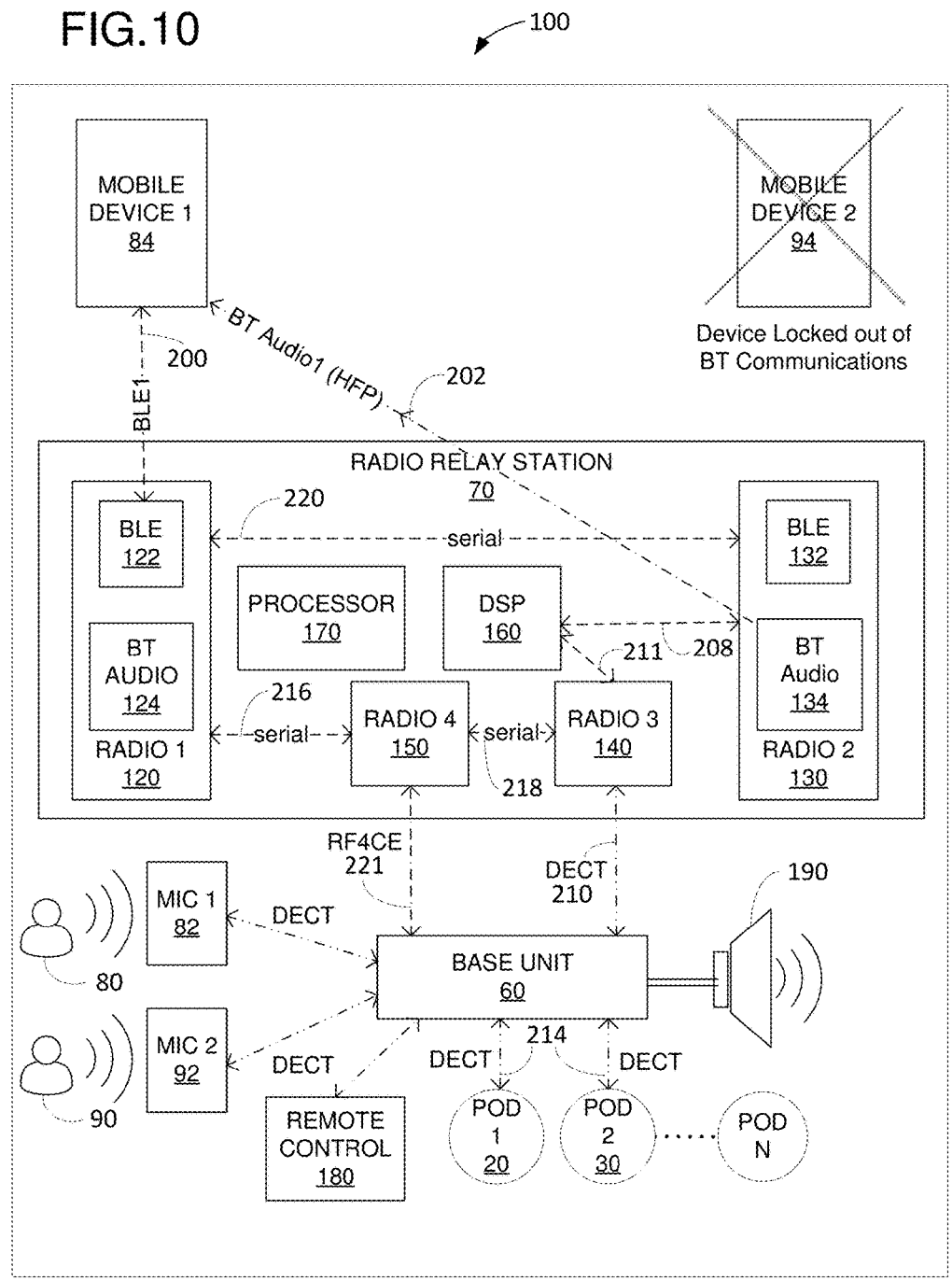
FIG. 10 shows another block diagram of an exemplary system with a mobile device (e.g. mobile device 2) locked out from communication with the radio relay station during recording of audio by a different mobile device (e.g. mobile device 1).
Figure 11:
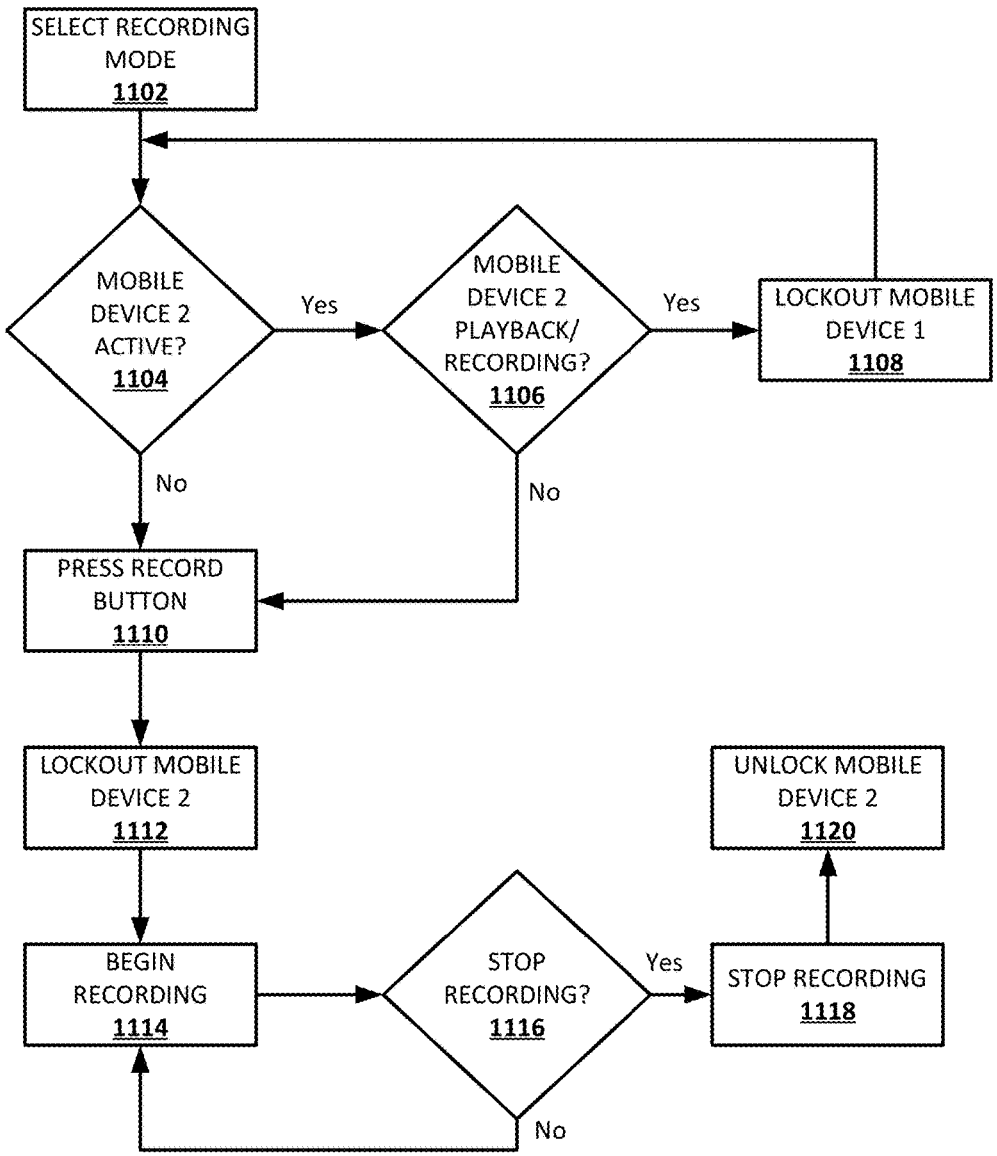
FIG. 11 is a flowchart illustrating an exemplary method of operating the system of FIG. 10 in a Recording mode.

FIG. 10 shows a block diagram of the system 100 along with illustrations of the transmission of signals between the components of the system when Recording mode is selected on the first mobile device 84. FIG. 11 is a flowchart 1100 depicting an example method of operating the system 100 when Recording mode is selected on the first mobile device 84.

In process block 1102, the first instructor 80 uses the first mobile device 84 to select Recording mode and to select one or more pods from which to record audio. Appropriate control signals are then sent from the first mobile device 84 to the BLE transceiver 122 of the first radio 120 indicating that Recording mode is selected along with the selected one or more pods. Control then passes to process block 1104.

In process block 1104, after Recording mode is selected on the first mobile device 84, the processor 170 determines whether the second mobile device 94 is active. If the processor 170 determines that the second mobile device 94 is not active, control passes to block 1110. If the processor 170 determines that the second mobile device 94 is active, control passes to block 1106.

In process block 1106, the processor 170 determines whether the second mobile device 94 is in either Playback or Recording mode. If the processor 170 determines that the second mobile device 94 is in one of these modes of operation, control passes to process block 1108. If the processor 170 determines that the second mobile device 94 is not in Playback or Recording mode, then control passes to process block 1110.

In process block 1108, the processor 170 causes the BLE transceiver 122 of the first radio 120 to send control signals to the first mobile device 84 to block the first mobile device from sending control signals or audio signals to the radio relay station 70, thereby locking out the first mobile device from communications with the radio relay station while the second mobile device 94 is in either Playback or Recording mode. In some examples, these control signals also cause the first mobile device 84 to display a message to indicate that the device is locked out because of the activity of the second mobile device 94 (e.g., "Playback in progress" if the second mobile device is in Playback mode of "Recording in progress" if the second mobile device is in Recording mode). Control then returns to process block 1104 such that the first mobile device 84 is prevented from entering Recording mode until the second mobile device 94 exits Playback or Recording Mode.

In process block 1110, the first instructor 80 presses a button on the first mobile device 84 to begin recording. In the illustrated example, this can be done with a button that appears in the app running on the first mobile device 84 labeled 'Begin Recording' or a similarly descriptive word or phrase. In other examples, other methods of initiating recording can be used. After the instructor 80 has initiated recording, control passes to process block 1112.

In process block 1112, the processor 170 causes the BLE transceiver 132 of the second radio 130 to send control signals to the second mobile device 94 to block the second mobile device from sending control signals or audio signals to the radio relay station 70. This ensures that the second mobile device 94 is locked out of communication with the radio relay station 70 while the first mobile device 84 is in Recording mode to avoid interference between data and audio signals as described above. Control then passes to process block 1114.

In process block 1114, the system 100 begins recording. In the illustrated example, the system 100 begins the recording shortly after, but almost simultaneously with, the locking out of the second mobile device 94. In other examples, the system 100 can begin recording at the same time the second mobile device is locked out or before the second mobile device is locked out. The same is true during locking out of one or more mobile devices during playback. Thus, when one mobile device is being used for recording or playing back audio, the other mobile device or devices not being used for recording or playback can be locked out during at least a portion of the time of recording or playback by the one mobile device. The at least a portion of the time includes the locking out of the other mobile device or devices during entire time or only during part of the time of recording or playback by the one mobile device. For example, the locking out can start prior to the beginning of the recording or playback by the one mobile device and end at the same time or after, and less desirably before, the ending of the recording or playback by the one mobile device. Alternatively, and less desirably due to potential interference before locking out, the locking out can start after the beginning of recording and playback by the one mobile device and end at the same time or after, and less desirably before, the ending of recording or playback by the one mobile device. Most desirably, locking out occurs at least during the entire time that the one mobile device is recording or playing back as this minimizes the interference with recording and playback arising from signals to the radio relay station by mobile devices other than the one mobile device.

In one illustrated example, recording is accomplished by the processor causing the fourth radio 150 to send control signals to the base unit 60, (such as by using the Zigbee RF4CE standard if radio 150 is an RF4CE radio), that cause the base unit 60 to send audio signals received from the selected one or more pods and from the first instructor device 82 from the base unit to the third radio 140 using the DECT standard (assuming the third radio is a DECT radio). After receiving these DECT audio signals, the third radio 140 sends the audio signals to the DSP unit 160 and the DSP unit conditions the audio signals. The audio signals are then sent from the DSP unit 160 to the second radio 130. After receiving the audio signals, the BT Audio transceiver 134 of the second radio 130 sends the audio signals to the first mobile device 84 using, for example, the Bluetooth® Hands Free Profile (HFP). Audio sent using HFP is a lower quality than audio sent using A2DP, however most smartphones at this time, do not allow A2DP audio to be recorded. Accordingly, the audio can be sent to the first mobile device 84 using HFP so that the audio can be recorded by the first mobile device. Other forms of audio signals can be transmitted to the mobile device as long as it is compatible for recording by the mobile device. When the HFP audio signals are received by the first mobile device 84, the audio signals are recorded and stored as an audio file on the first mobile device. As such, this stored audio file can later be played back by an individual who can listen to the communications between the first instructor 80 and the students at the selected one or more pods. Control then passes to process block 1116.

In some examples, the first mobile device 84 can also record video using the first mobile device's camera, assuming the first mobile device has a camera, while the audio is being recorded. In these examples, the first instructor 80 can aim the camera of the first mobile device 80 at whatever they wish to record, such as at the students in a pod that is remote from the instructor (e.g. across the room) or adjacent to the instructor from which the audio is being recorded. The video is typically taken of the area proximate to the students who are being recorded. The area proximate to the students being recorded means of the area in which the students being recorded are located. The first mobile device 84 can then record this captured video at the same time as the received audio is being recorded, either in separate files or together in one file. In some examples, the first mobile device 84 can delay the recording of either the audio or video signal in order to better synchronize the two signals.

In some examples, the first instructor 80 can capture still photos using the camera of the first mobile device 84 while audio is being recorded. In some examples, the app running on the first mobile device 84 can have one option to record only audio, one option to record audio and video together, and one option to record audio along with the ability to capture still photos.

In process block 1116, the processor 170 determines whether the first instructor 80 has indicated that recording should stop. In the illustrated example, the first instructor 80 can stop recording by using the app running on the first mobile device 84 to press a button that appears during recording labeled 'Stop Recording' or a similar descriptive word or phrase. In other examples, other methods of indicating that recording should be stopped can be used. Once the first instructor 80 indicates that recording should stop, the first mobile device 84 sends control signals to the BLE transceiver 122 of the first radio 120 indicating as much.

When the first radio 120 receives a control signal from the first mobile device 84 indicating that recording should stop, the processor 170 determines that recording should be stopped and control passes to process block 1118. If such a control signal is not received by the first radio, the processor 170 determines that playback should not be stopped and control returns to process block 1114. In this manner, recording continues until the first instructor 80 indicates that recording should stop.

In process block 1118, the processor 170 causes the fourth radio 150 to send control signals to the base unit 60 that cause the base unit to stop transmitting audio to the third radio 140. Control then passes to process block 1120.

In process block 1120, the processor 170 causes the BLE transceiver 132 of the second radio 130 to send control signals to the second mobile device 94 causing the second mobile device to no longer be blocked from sending control or data signals to the radio relay station 70, thereby unlocking the second mobile device and once again allowing Bluetooth® communication with the radio relay station.

Figure 12:
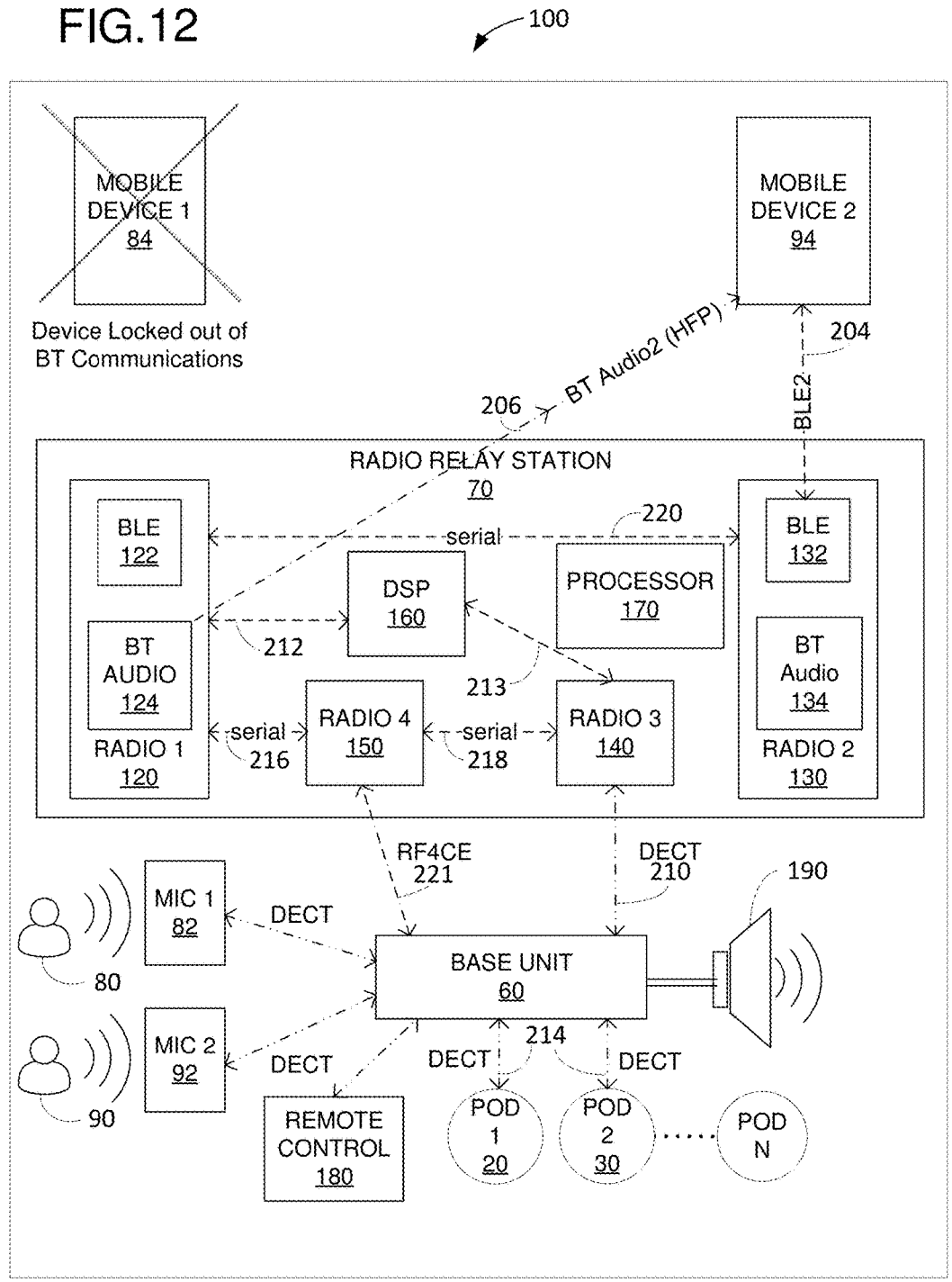
FIG. 12 shows another block diagram of an exemplary system with a mobile device (e.g. mobile device 1) locked out from communication with the radio relay station during recording of audio by a different mobile device (e.g. mobile device 2).
Figure 13:
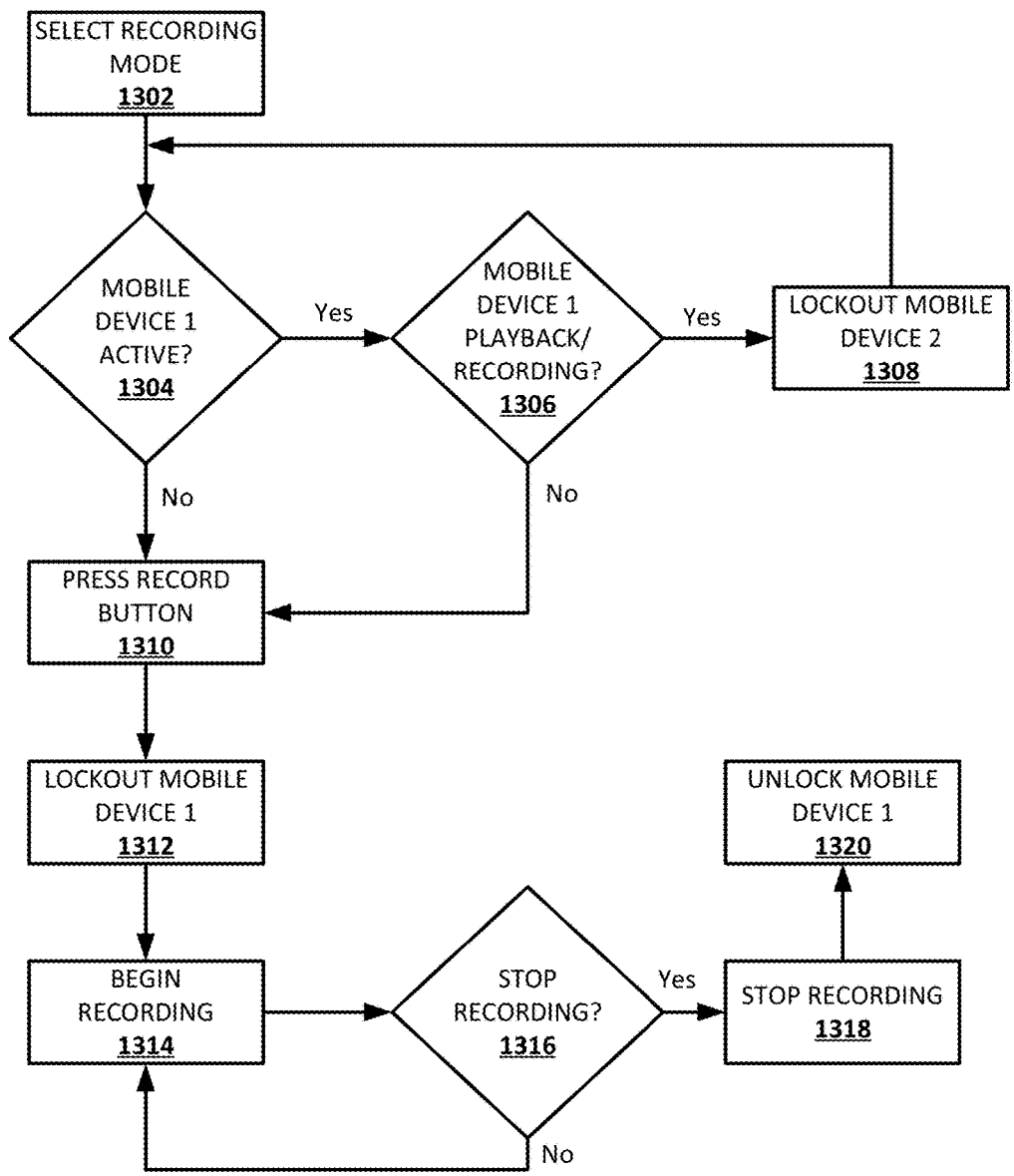
FIG. 13 is a flowchart illustrating another exemplary method of operating the system of FIG. 12 in a Recording mode.

FIG. 12 shows a block diagram of the system 100 along with illustrations of the transmission of signals between the components of the system when Recording mode is selected on the second mobile device 94. FIG. 13 is a flowchart 1300 depicting an example method of operating the system 100 when Recording mode is selected on the second mobile device 94.

In process block 1302, the second instructor 90 uses the second mobile device 94 to select Recording mode and to select one or more pods from which to record audio. Appropriate control signals are then sent from the second mobile device 94 to the BLE transceiver 132 of the second radio 130 indicating that Recording mode is selected along with the selected one or more pods. Control then passes to process block 1304.

In process block 1304, after Recording mode is selected on the second mobile device 94, the processor 170 determines whether the second mobile device 94 is active. If the processor 170 determines that the second mobile device 94 is not active, control passes to block 1310. If the processor 170 determines that the second mobile device 94 is active, control passes to block 1306.

In process block 1306, the processor 170 determines whether the first mobile device 84 is in either Playback or Recording mode. If the processor 170 determines that the first mobile device 84 is in one of these modes of operation, control passes to process block 1308. If the processor 170 determines that the first mobile device 84 is not in Playback or Recording mode, then control passes to process block 1310.

In process block 1308, the processor 170 causes the BLE transceiver 132 of the second radio 130 to send control signals to the second mobile device 94 to block the second mobile device from sending control signals or audio signals to the radio relay station 70, thereby locking out the second mobile device from communications with the radio relay station while the first mobile device 84 is in either Playback or Recording mode. In some examples, these control signals also cause the second mobile device 94 to display a message to indicate that the device is locked out because of the activity of the first mobile device 84. Control then returns to process block 1304 such that the second mobile device 94 is prevented from entering Recording mode until the first mobile device 84 exits Playback or Recording Mode.

In process block 1310, the second instructor 90 presses a button on the second mobile device 94 to begin recording. After the instructor 90 has initiated recording, control passes to process block 1312.

In process block 1312, the processor 170 causes the BLE transceiver 122 of the first radio 120 to send control signals to the first mobile device 84 to block the first mobile device from sending control signals or audio signals to the radio relay station 70. This ensures that the first mobile device 84 is locked out of communication with the radio relay station 70 while the second mobile device 94 is in Recording mode to avoid interference between data and audio signals as described above. Control then passes to process block 1314.

In process block 1314, the system 100 begins recording. This is accomplished by the processor causing the fourth radio 150 to send control signals to the base unit 60, (such as by using the Zigbee RF4CE standard if the fourth radio is an RF4CE radio), that cause the base unit 60 to send audio signals received from the selected one or more pods and from the first instructor device 82 from the base unit to the third radio 140 using the DECT standard (assuming that the third radio is a DECT radio). After receiving these DECT audio signals, the third radio 140 sends the audio signals to the DSP unit 160 and the DSP unit conditions the audio signals. The audio signals are then sent from the DSP unit 160 to the first radio 120. After receiving the audio signals, the BT Audio transceiver 124 of the first radio 120 sends the audio signals to the second mobile device 94, such as using HFP. When the HFP audio signals are received by the second mobile device 94, the audio signals are recorded and stored as an audio file on the second mobile device. As such, this stored audio file can later be played back by an individual who can listen to the communications between the second instructor 90 and the students at the selected one or more pods. In some examples, the second mobile device 94 can also record video or still photos using the second mobile device's camera while the audio is being recorded in a similar manner as discussed above in connection with FIGS. 11-12.

In process block 1316, the processor 170 determines whether the second instructor 90 has indicated that recording should stop. Once the second instructor 90 indicates that recording should stop, the second mobile device 94 sends control signals to the BLE transceiver 132 of the second radio 130 indicating as much.

When the second radio 130 receives a control signal from the second mobile device 94 indicating that recording should stop, the processor 170 determines that recording should be stopped and control passes to process block 1318. If such a control signal is not received by the second radio, the processor 170 determines that playback should not be stopped and control returns to process block 1314. In this manner, recording continues until the second instructor 90 indicates that recording should stop.

In process block 1318, the processor 170 causes the fourth radio 150 to send control signals to the base unit 60 that cause the base unit to stop transmitting audio to the third radio 140. Control then passes to process block 1320.

In process block 1320, the processor 170 causes the BLE transceiver 132 of the second radio 130 to send control signals to the second mobile device 94 causing the first mobile device to no longer be blocked from sending control or data signals to the radio relay station 70, thereby unlocking the first mobile device and once again allowing communication between the first mobile device and the radio relay station.

Figure 14:
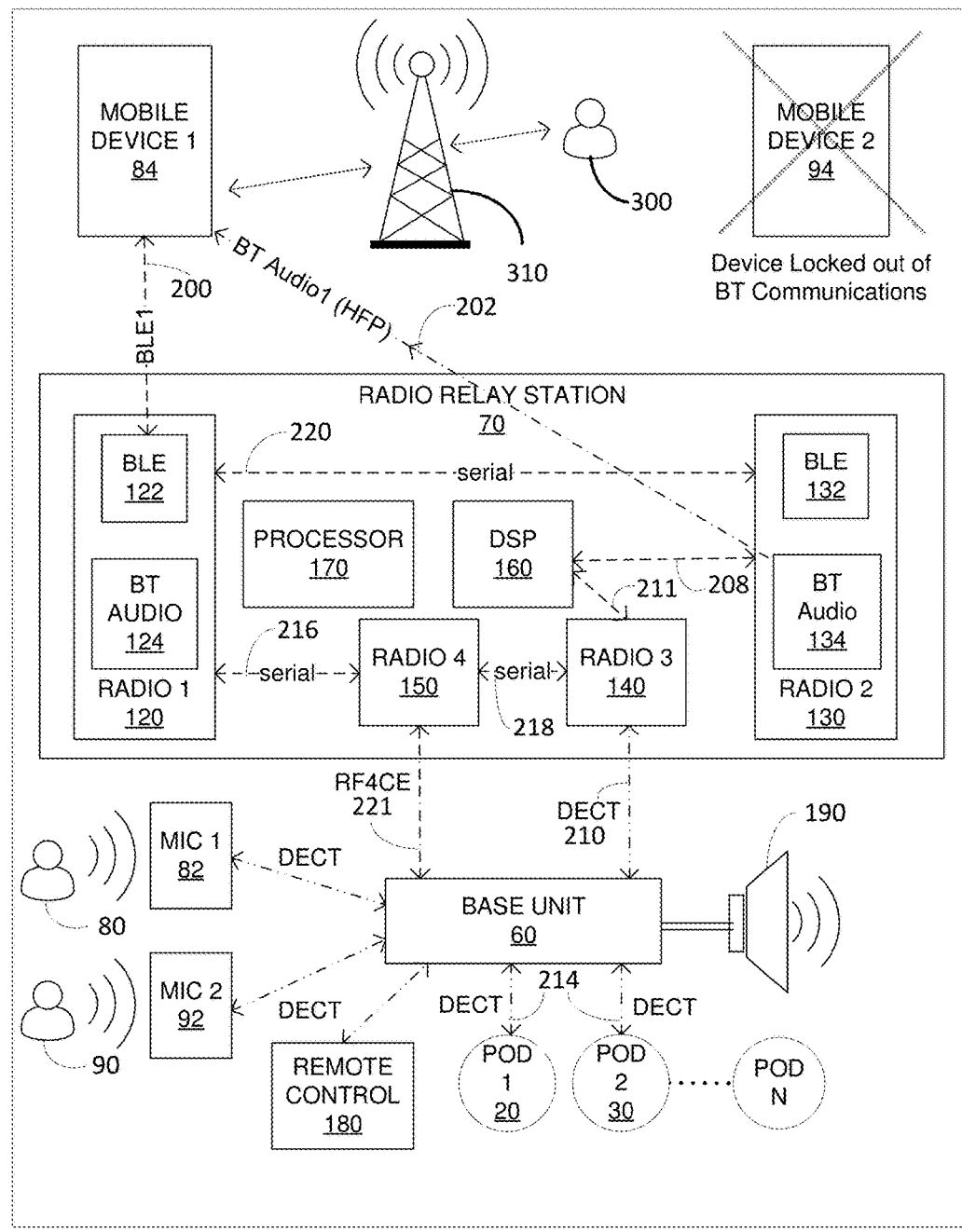
FIG. 14-15 show additional block diagrams of the exemplary system in different operating modes.

Another mode of operation for the system 100 is distance learning. FIG. 14 shows a block diagram of the system 100 along with the flow of signals between the components in distance learning mode. In this mode of operation, the first mobile device 84 contacts a third party 300, such as a supervisor or an outside expert on a particular topic, who is not located in the classroom 12. This third party can then communicate with the instructor and the students in a selected one or more pods as described herein. This communication can also be with a remote information source, such as a broadcast television signal or information from the World Wide Web.

In the illustrated example where the first and second mobile device 84, 94 are smartphones, the first mobile device calls the third party using the cellular capabilities of the device (e.g., the call is established through a cell tower 300). In other examples where the first and second mobile device 84, 94 are not smartphones, other methods of contacting a third party can be used (e.g., establishing an internet connection). The third party 300 can then speak to the first instructor 80 using their phone or another appropriate communication device such as another mobile device or computer.

In the illustrated example of FIG. 14, once a connection is established between the mobile device 84 and the third party 300, the instructor 80 can select one or more pods and a communication pathway is established between the first instructor unit 82 and the selected one or more pods in a manner as discussed above in connection with FIG. 4 for the Remote mode of operation of the system 100. Additionally, an audio pathway can be established between the third party 300 and the one or more selected pods. This can be accomplished by sending audio from the third party 300 from the first mobile device 84 to the BT audio transceiver 134 of the second radio 130 using, for example, HFP, then from the BT Audio transceiver 134 to the DSP unit 160, then to the third radio 140, then to the base unit 60 using DECT (for example) and then to the selected one or more pods using DECT (for example). In addition, audio detected by the speaker unit microphones at the selected one or more pods can be sent from the pods to the base unit 60 using DECT (for example), from the base unit to the third radio 140 using DECT (for example), from the third radio to the DSP unit 160, from the DSP unit 160 to the BT Audio transceiver 134 of the second radio, from the BT Audio transceiver 134 to the first mobile device 84, and from the mobile device 84 to the third party 300. Accordingly, the first instructor 80, the third party 300 and the students at the selected one or more pods can all communicate together.

Figure 15:
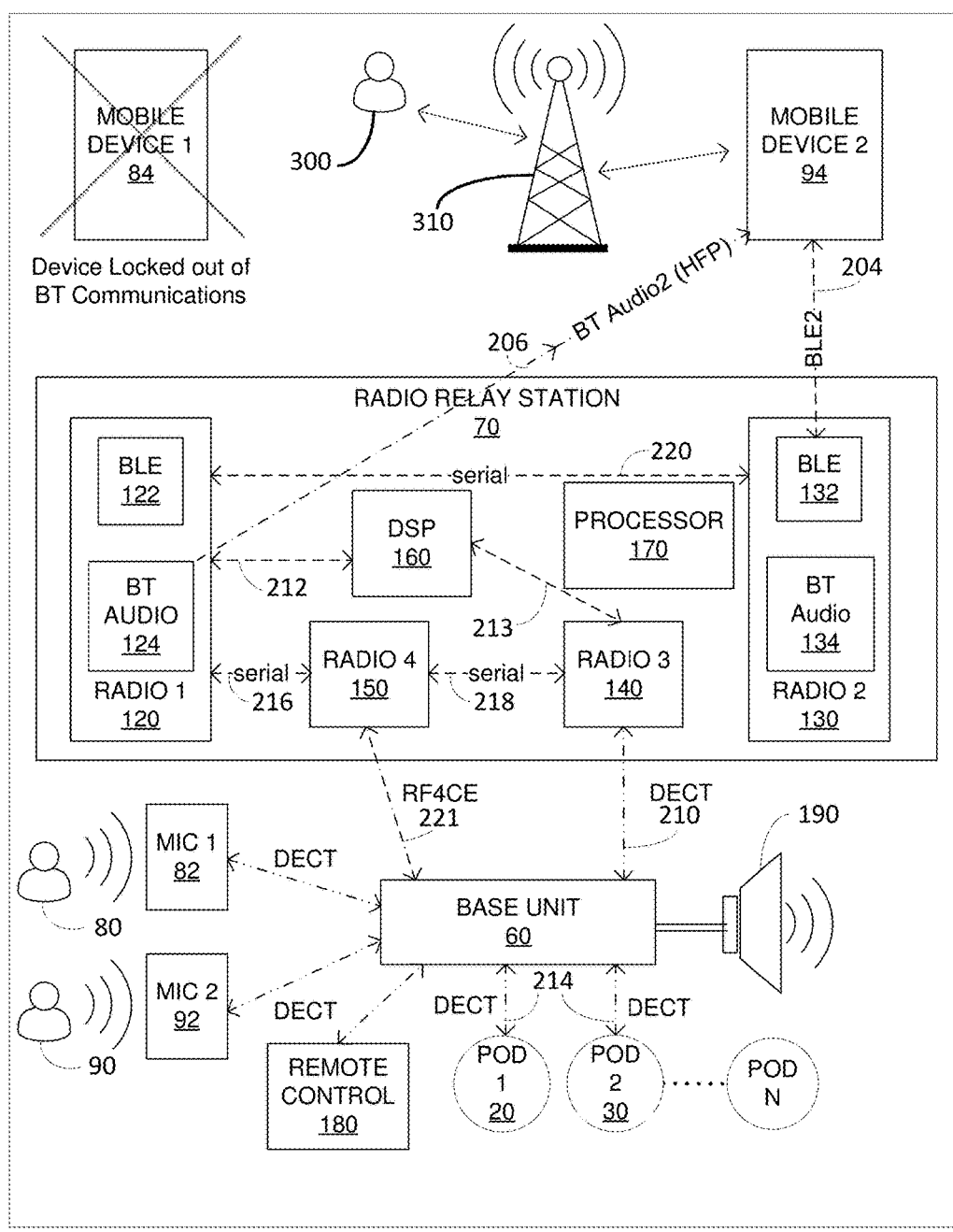

FIG. 15 shows a block diagram of the system 100 along with the flow of signals between the components in distance learning mode utilizing the second mobile device 94. In this mode of operation, the second mobile device 94 contacts the third party 300 and one or more pods are selected. A first audio pathway is then established between the second mobile device 94 and the selected one or more pods in a similar manner to the Remote mode of operation of the system 100 described in connection with FIG. 5. In addition, a second audio pathway is established between the third party 300 and the selected one or more pods. This second audio pathway can be established by sending audio from the third party 300 from the second mobile device 94 to the BT audio transceiver 124 of the first radio 120 using, for example, HFP, then from the BT Audio transceiver 124 to the DSP unit 160, then to the third radio 140, then to the base unit 60 using DECT (for example) and then to the selected one or more pods using DECT. (for example) In addition, audio detected by the speaker unit microphones at the selected one or more pods can be sent from the pods to the base unit 60 using DECT (for example), from the base unit to the third radio 140 using DECT (for example), from the third radio to the DSP unit 160, from the DSP unit 160 to the BT Audio transceiver 124 of the first radio, from the BT Audio transceiver 124 to the second mobile device 94, and from the mobile device 94 to the third party 300. Accordingly, the second instructor 90, the third party 300 and the students at the selected one or more pods can all communicate together.

Figure 16:
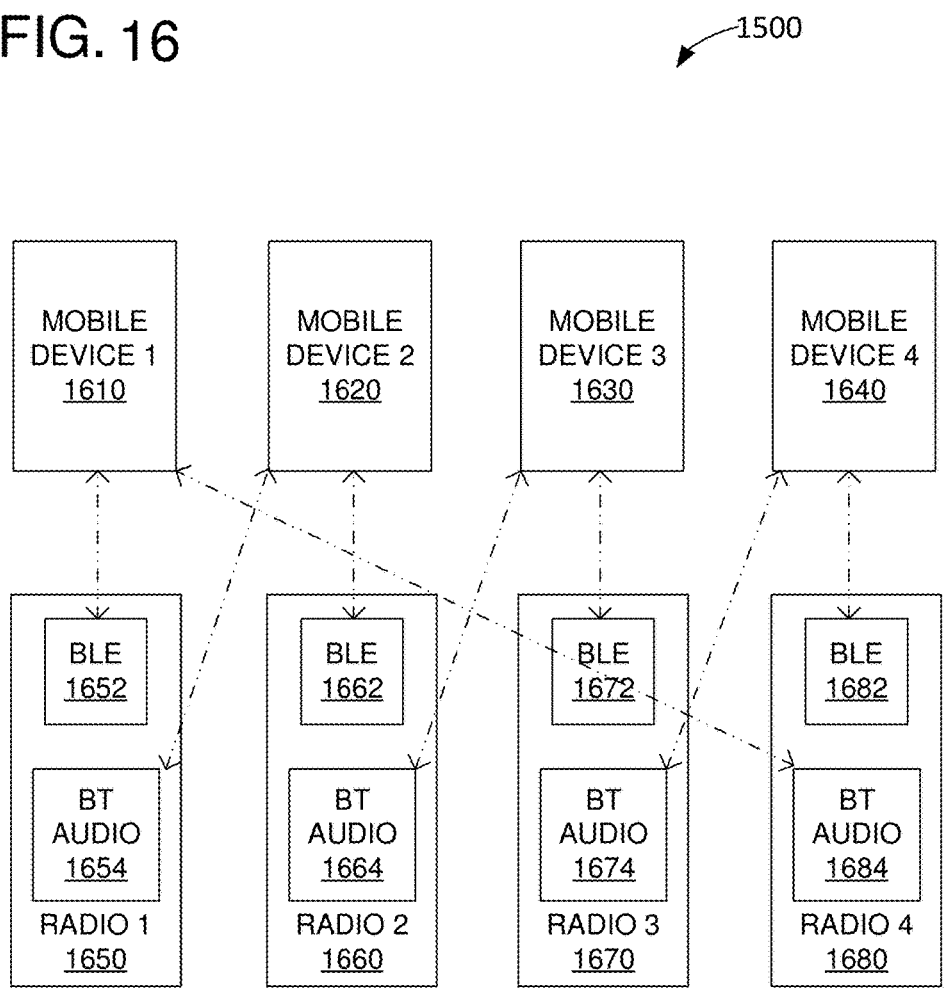
FIG. 16 shows another exemplary classroom audio system that is coupled to more than two mobile devices.

FIG. 16 shows a portion of an exemplary classroom system 1600. In the example of FIG. 16, the system 1600 comprises four mobile devices 1610, 1620, 1630, and 1640 and four radios 1650, 1660, 1670, and 1680 like the radios 120, 130 described above, for example Bluetooth® radios with BLE control portions and Bluetooth audio portions. The system 1600 may be desirable in a larger classroom with more than two instructors. For example, if each instructor has her/his own mobile device, the system of FIG. 16 accommodates four instructors. Additional radios can be added to expand the system in the same manner if desired.

In the various examples discussed above, the exemplary system 100 uses two mobile devices and two Bluetooth® radios, with each radio having a BLE transceiver that is used to send and receive control signals and a BT Audio transceiver that is used to send and receive audio signals. As discussed in various examples above, in order to reduce the possibility of signal interference, the first mobile device sends control signals to the first radio and audio signals to the second radio, whereas the second mobile device sends control signals to the second radio and audio signals to the first radio.

In the illustrated example of FIG. 16, to reduce the possibility of signal interference, the first mobile device 1610 sends control signals to BLE transceiver 1652 on the first radio 1650 and audio signals to BT Audio transceiver 1684 on the fourth radio 1680. The second mobile device 1620 sends control signals to BLE transceiver 1662 on the second radio 1660 and audio signals to BT Audio transceiver 1654 on the first radio 1650. The third mobile device 1630 sends control signals to BLE transceiver 1672 on the third radio 1670 and audio signals to BT Audio transceiver 1664 on the second radio 1660. And the fourth mobile device 1640 sends control signals to BLE transceiver 1682 on the fourth radio 1680 and audio signals to BT Audio transceiver 1674 on the third radio 1670.

In the illustrated example of FIG. 16, if the first mobile device 1610 were to be used in either Playback or Recording mode, such that it would be sending or receiving audio signals, the system 1600 would lockout the second and fourth mobile devices 1620, 1640 because each of these mobile devices share a radio with the first mobile device 1610. Thus, locking out these devices would ensure that the first radio 1650 and the fourth radio 1680 used by the first mobile device 1610 would not be simultaneously receiving control and audio signals, which could potentially cause signal interference. Similarly, if the second mobile device 1620 were to be used in Playback or Recording mode, the system 1600 would lockout the first and third mobile devices 1610, 1630. If the third mobile device 1630 were to be used in Playback, or Recording mode, the system 1600 would lockout the second and fourth mobile devices 1620, 1640. And if the fourth mobile device 1640 were to be used in Playback or Recording mode, the system 1600 would lockout the first and third mobile devices 1610, 1630. In other examples, when any of the mobile devices 1610, 1620, 1630, 1640 are used in Playback or Recording mode, the system 1600 can lockout all other mobile devices. In other examples, a classroom can have multiple radio relay stations that each have two radios as in the example system 100 and two mobile devices that communicate with each radio relay station.

In the illustrated example, the app running on the first and second mobile device 84, 94 can also be used to change a number of settings for the system 100 such as playback and recording volumes and microphone levels.

Representative Computing Environment

Figure 17:
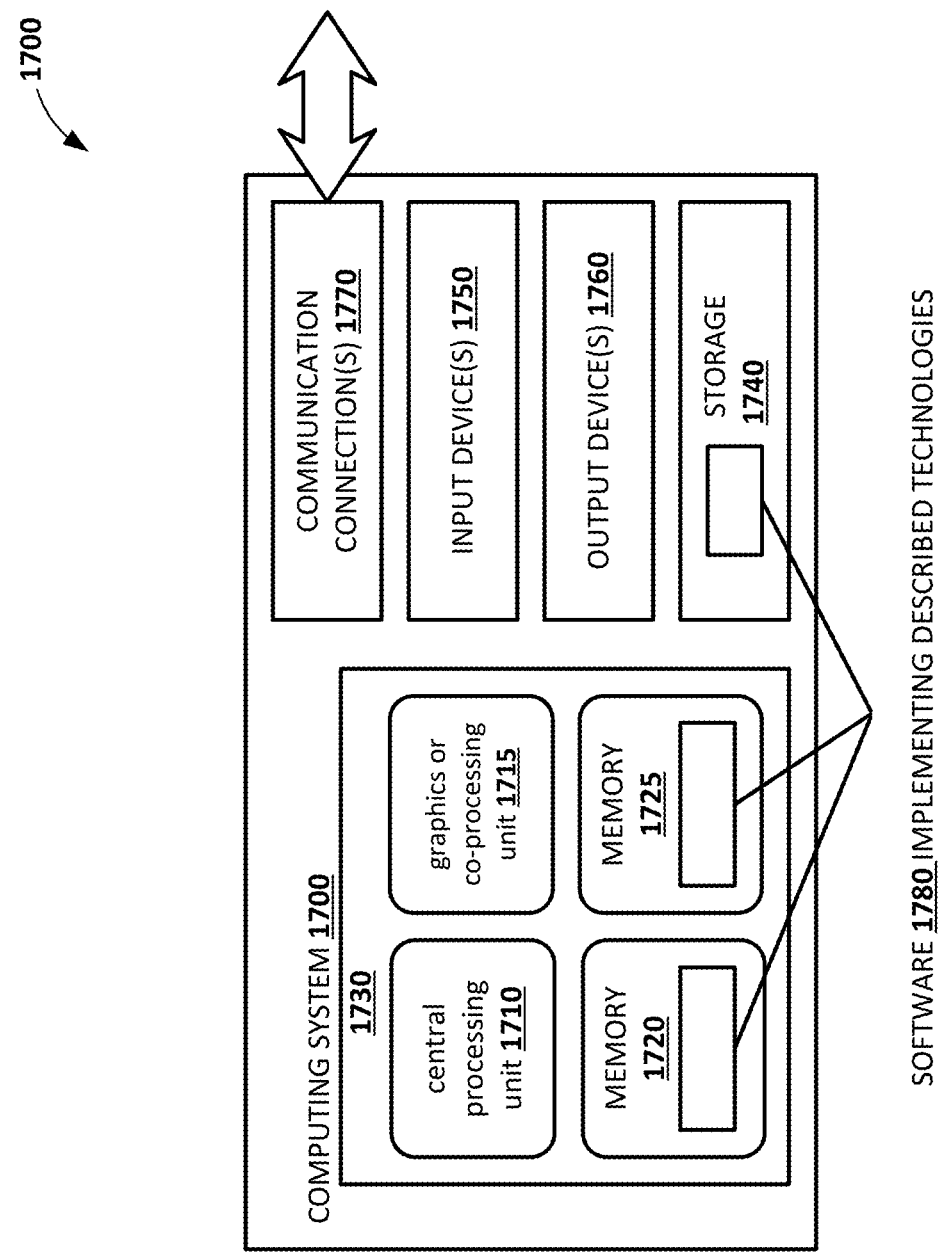
FIG. 17 is a diagram of an example computing system in which some described embodiments can be implemented.

FIG. 17 depicts a generalized example of a suitable computing system 1700 for the processor 170. The computing system 1700 is not intended to suggest any limitation as to scope of use or functionality, as the innovations may be implemented in diverse general-purpose or special-purpose computing systems.

With reference to FIG. 17, the computing system 1700 includes one or more processing units 1710, 1715 and memory 1720, 1725. The processing units 1710, 1715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 17 shows a central processing unit 1710 as well as a graphics processing unit or co-processing unit 1715. The tangible memory 1720, 1725 may be volatile memory (e.g., registers, cache, RAM), non-volatile memory (e.g., ROM, EEPROM, flash memory, etc.), or some combination of the two, accessible by the processing unit(s). The memory 1720, 1725 stores software 1780 implementing one or more innovations described herein, in the form of computer-executable instructions suitable for execution by the processing unit(s).

A computing system may have additional features. For example, the computing system 1700 includes storage 1740, one or more input devices 1750, one or more output devices 1760, and one or more communication connections 1770. An interconnection mechanism (not shown) such as a bus, controller, or network interconnects the components of the computing system 1700. Typically, operating system software (not shown) provides an operating environment for other software executing in the computing system 1700, and coordinates activities of the components of the computing system 1700.

The tangible storage 1740 may be removable or non-removable, and includes magnetic disks, magnetic tapes or cassettes, CD-ROMs, DVDs, or any other medium which can be used to store information in a non-transitory way and which can be accessed within the computing system 1700. The storage 1740 stores instructions for the software 1780 implementing one or more innovations described herein.

The input device(s) 1750 may be a touch input device such as a keyboard, mouse, pen, or trackball, a voice input device, a scanning device, or another device that provides input to the computing system 1700. For video encoding, the input device(s) 1750 may be a camera, video card, TV tuner card, or similar device that accepts video input in analog or digital form, or a CD-ROM or CD-RW that reads video samples into the computing system 1700. The output device(s) 1760 may be a display, printer, speaker, CD-writer, or another device that provides output from the computing system 1700.

The communication connection(s) 1770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones, other mobile devices that include computing hardware, or programmable automation controllers). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood to one of ordinary skill in the art having the benefit of the present disclosure that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Having illustrated and described the principles of our invention with reference to a number of embodiments, it should be apparent to those of ordinary skill in the art that these embodiments can be modified in arrangement and detail without departing from the inventive principles disclosed herein. We claim all such modifications as follows within the scope of the claims set forth below.

We claim:

1. A distributed audio system for transmitting audio signals to and receiving audio signals from at least one remote audio source and for transmitting and receiving audio and control signals to and from at least first and second mobile devices, the distributed audio system comprising:

a first radio comprising a first control data pathway for wirelessly coupling to the first mobile device through which first control signals are wirelessly transmitted to and received from the first mobile device, the first radio comprising a first audio pathway for wirelessly coupling to the second mobile device through which audio signals are wirelessly transmitted to and received from the second mobile device;

a second radio comprising a second control data pathway for wirelessly coupling to the second mobile device through which second control signals are wirelessly transmitted to and received from the second mobile device, the second radio comprising a second audio pathway for wirelessly coupling to the first mobile device through which audio signals are wirelessly transmitted to and received from the second mobile device;

a processor coupled to the first and second radios and programmed to cause the delivery of control signals to the second mobile device through the second control data pathway to block the transmission of control signals from the second mobile device to the second control data pathway and to block the transmission of audio signals from the second mobile device to the first audio pathway at least during a portion of a time that the first mobile device is receiving audio signals through the second audio pathway from the at least one remote audio source and recording the received audio signals from the at least one remote audio source, the processor also being programmed to cause the delivery of control signals to the first mobile device through the first control data pathway to block the transmission of control signals from the first mobile device to the first control data pathway and to block the transmission of audio signals from the first mobile device to the second audio pathway at least during a portion of a time that the second mobile device is receiving audio signals through the first audio pathway from the at least one remote audio source and recording the received audio signals from the at least one remote audio source.

2. A distributed audio system according to claim 1 wherein the processor is programmed to cause a message to be displayed at the one of the first and second mobile devices from which the transmission of control signals and audio signals is blocked, the blocked mobile device to indicate the blocking out of the blocked mobile device.

3. A distributed audio system according to claim 1 wherein the first and second radios have Bluetooth low energy (BLE) standard enabled respective first and second control data pathways and Bluetooth (BT) enabled respective first and second audio pathways.

4. A distributed audio system according to claim 1 further comprising a third radio coupled to the first and second audio pathways and to the first and second control data pathways and wirelessly coupled to the at least one remote audio source, in response to control signals from the processor, the third radio receiving and delivering audio signals from the at least one remote audio source to the first and second audio pathways.

5. A distributed audio system according to claim 4 wherein the third radio is a Digital Enhanced Cordless Telecommunications (DECT) standard enabled radio.

6. A distributed audio system according to claim 4 further comprising a fourth radio coupled to the first and second control data pathways and wirelessly coupled to the at least one remote audio source, in response to control signals from the processor, the fourth radio receiving and delivering control signals to cause the at least one remote audio source to transmit audio signals to the first and second audio pathways.

7. A distributed audio system according to claim 6 wherein the fourth radio is a Radio Frequency for Consumer Electronics (Zigbee RF4CE) standard enabled radio.

8. A distributed audio system according to claim 1 wherein the first and second radios have Bluetooth low energy (BLE) standard enabled respective first and second control data pathways and Bluetooth (BT) enabled respective first and second audio pathways, further comprising a third radio coupled to the first and second audio pathways and to the first and second control data pathways and wirelessly coupled to the at least one remote audio source, in response to control signals from the processor, the third radio receiving and delivering audio signals from the at least one remote audio source to the first and second audio pathways, wherein the third radio is a Digital Enhanced Cordless Telecommunications (DECT) standard enabled radio, and further comprising a fourth radio coupled to the first and second control data pathways and wirelessly coupled to the at least one remote audio source, in response to control signals from the processor, the fourth radio receiving and delivering control signals to cause the at least one remote audio source to transmit audio signals to the first and second audio pathways, and wherein the fourth radio is a Radio Frequency for Consumer Electronics (Zigbee RF4CE) standard enabled radio.

9. A distributed audio system according to claim 8 wherein the first, second, third and fourth radios are on a common circuit board with opposed first and second edges and opposed third and fourth side edges, wherein the first radio is positioned adjacent to the first side edge and the second radio is positioned adjacent to the second side edge, wherein the third radio is positioned in a central section of the circuit board and at a location that that is further from the first side edge than the first radio and further from the second side edge than the second radio and nearer to the fourth side edge than the third side edge, and wherein the fourth radio is positioned between the first and second side edges in a section of the circuit board that is between the first and second radios and adjacent to the third side edge.

10. A distributed audio system according to claim 1, wherein the first mobile device is not blocked by control signals on the first control data pathway from recording video of the location proximate to the at least one remote audio source during at least a portion of the time that the first mobile device is receiving audio signals through the second audio pathway and recording the received audio signals such that the first mobile device can record video corresponding to the recorded audio; and wherein the second mobile device is not blocked by control signals on the second control data pathway from recording video of the location proximate to the at least one remote audio source during at least a portion of the time that the second mobile device is receiving audio signals through the first audio pathway and recording the received audio signals such that the second mobile device can record video corresponding to the recorded audio.

11. A distributed audio system according to claim 1, wherein the processor is programmed to cause the delivery of control signals to the second mobile device through the second control data pathway to block the transmission of control signals from the second mobile device to the second control data pathway and to block the transmission of audio signals from the second mobile device to the first audio pathway at least during a portion of a time that the first mobile device is transmitting audio signals through the second audio pathway to the at least one remote audio source, the processor also being programmed to cause the delivery of control signals to the first mobile device through the first control data pathway to block the transmission of control signals from the first mobile device to the first control data pathway and to block the transmission of audio signals from the first mobile device to the second audio pathway at least during a portion of a time that the second mobile device is transmitting audio signals through the first audio pathway to the at least one remote audio source.

12. A distributed audio system comprising:
a radio relay station;
a base unit coupled to the radio relay station; a plurality of speaker units, each speaker unit comprising a microphone and a speaker;
the radio relay station comprising a first radio configured to send and receive first control signals to and from a first mobile device and first audio signals to and from a second mobile device, and a second radio configured to send and receive second control signals to and from the second mobile device and second audio signals to and from the first mobile device, the radio relay station also being configured to send relay control signals to the speaker units corresponding to the first and second control signals and relay audio signals to the speaker units corresponding to the first and second audio signals; wherein the base unit is configured to receive the relay control signals and relay audio signals from the radio relay station, the base unit being configured to transmit speaker unit control signals corresponding to the relay control signals to one or more of the speaker units selected in response to the relay control signals, the base unit being configured to transmit audio signals corresponding the first and second audio signals to one or more speakers of the speaker units selected in response to the speaker unit control signals, the base unit also being configured to receive audio signals corresponding to audio detected by one or more microphones of the speaker units selected in response to the speaker unit control signals and to transmit the audio signals corresponding to the audio at the microphones at the selected one or more speaker units to the relay station for transmission by the relay station as audio signals to one of the first and second mobile devices selected in response to the first and second control signals;
and wherein the speakers of one or more of the speaker units selected in response to the speaker unit control signals broadcast audio corresponding to the one or more audio signals, and audio signals corresponding to audio detected by the microphones of one or more of the speaker units selected in response to the speaker unit control signals are transmitted to the base unit and to one of the first and second mobile devices selected in response to the control signals for recording by the selected one of the first and second mobile devices.

13. The distributed audio system of claim 12, wherein, in response to first control signals from the first mobile device that cause the radio relay station to send relay control signals to the base unit that cause audio signals corresponding to the second audio signals to be sent from the radio relay station to one or more of the speaker units selected in response to the speaker control signals, the second radio sends second control signals to the second mobile device to block the second mobile device from sending second control signals and first audio signals to the radio relay station; and wherein, in response to second control signals from the second mobile device that cause the radio relay station to send relay control signals to the base unit that cause audio signals corresponding to the first audio signals to be sent to one or more of the speaker units selected in response to the speaker control signals, the first radio sends first control signals to the first mobile device to block the first mobile device from sending first control signals and second audio signals to the radio relay station.

14. The distributed audio system of claim 13, further comprising:
   a first instructor unit comprising a first instructor unit speaker and a first instructor unit microphone;
   a second instructor unit comprising a second instructor unit speaker and a second instructor unit microphone;
   wherein, in response to first control signals, the radio relay station sends relay control signals to the base unit causing the base unit to open an audio pathway between the first instructor unit and one or more of the speaker units selected in response to the first control signals; and
   wherein, in response to second control signals, the radio relay station sends relay control signals to the base unit causing the base unit to open an audio pathway between the second instructor unit and one or more of the speaker units selected in response to the second control signals.

15. The distributed audio system of claim 14, further comprising:
   a remote control configured to send remote control signals to the base unit causing the base unit to open an audio pathway between one or more of the first instructor unit and the second instructor unit and one or more of the speaker units selected in response to the remote control signals.

16. The distributed audio system of claim 13, wherein the first and second control signals are sent to the first and second mobile devices by the radio relay station using a Bluetooth Low Energy (BLE) radio, wherein the first and second control signals are received from the first and second mobile devices by the radio relay station using a Bluetooth Low Energy (BLE) radio, wherein the first and second audio signals are received from the first and second mobile devices by the radio relay station using a Bluetooth (BT) radio, and wherein the first and second audio signals are sent from the radio relay station to the first and second mobile devices using a Bluetooth (BT) radio.

17. The distributed audio system of claim 13, wherein the relay control signals are sent to the base unit from the radio relay station using a Radio Frequency for Consumer Electronics (Zigbee RF4CE) standard protocol, and wherein the first and second audio signals are sent to the base unit from the radio relay station using a Digital Enhanced Cordless Telecommunications (DECT) standard protocol.

18. The distributed audio system of claim 12, wherein the radio relay station further comprises a third radio to send and receive audio signals to and from the base unit and a fourth radio to send relay control signals to the base unit.

19. A distributed audio system according to claim 8 wherein the first, second, third and fourth radios are on a common circuit board with opposed first and second edges and opposed third and fourth side edges, wherein the first radio is positioned adjacent to the first side edge and the second radio is positioned adjacent to the second side edge, wherein the third radio is positioned in a central section of the circuit board and at a location that that is further from the first side edge than the first radio and further from the second side edge than the second radio and nearer to the fourth side edge than the third side edge, and wherein the fourth radio is positioned between the first and second side edges in a section of the circuit board that is between the first and second radios and adjacent to the third side edge.

20. A method for transmitting audio signals to and receiving audio signals from at least one remote audio source and for transmitting and receiving audio and control signals to and from at least first and second mobile devices, the method comprising:
   wirelessly coupling the first mobile device to a first radio via a first control data pathway through which first control signals are wirelessly transmitted to and received from the first mobile device and wirelessly coupling the second mobile device to the first radio via a first audio pathway through which audio signals are wirelessly transmitted to and received from the second mobile device;
   wirelessly coupling the second mobile device to a second radio via a second control data pathway through which second control signals are wirelessly transmitted to and received from the second mobile device and wirelessly coupling the first mobile device to the second radio via a second audio pathway through which audio signals are wirelessly transmitted to and received from the first mobile device;
   delivering control signals to the second mobile device through the second control data pathway to block the transmission of control signals from the second mobile device to the second control data pathway and to block the transmission of audio signals from the second mobile device to the first audio pathway at least during a portion of a time that the first mobile device is receiving audio signals through the second audio pathway from the at least one remote audio source and recording the received audio signals from the at least one remote audio source, and delivering control signals to the first mobile device through the first control data pathway to block the transmission of control signals from the first mobile device to the first control data pathway and to block the transmission of audio signals from the first mobile device to the second audio pathway at least during a portion of a time that the second mobile device is receiving audio signals through the first audio pathway from the at least one remote audio source and recording the received audio signals from the at least one remote audio source.

21. The method of claim 20, further comprising:
   delivering control signals to the second mobile device through the second control data pathway to block the transmission of control signals from the second mobile device to the second control data pathway and to block the transmission of audio signals from the second mobile device to the first audio pathway at least during a portion of a time that the first mobile device is transmitting audio signals through the second audio pathway to the at least one remote audio source; and
   delivering control signals to the first mobile device through the first control data pathway to block the transmission of control signals from the first mobile device to the first control data pathway and to block the transmission of audio signals from the first mobile device to the second audio pathway at least during a portion of a time that the second mobile device is transmitting audio signals through the first audio pathway to the at least one remote audio source.

* * * * *